(12) United States Patent
Lee et al.

(10) Patent No.: US 11,997,723 B2
(45) Date of Patent: *May 28, 2024

(54) METHOD AND APPARATUS FOR DETERMINING WHETHER TO PERFORM TRANSMISSION ON A RANDOM ACCESS OR A CONFIGURED GRANT IN WIRELESS COMMUNICATION SYSTEM

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,908

(22) Filed: Feb. 22, 2023

(65) Prior Publication Data
US 2023/0209609 A1 Jun. 29, 2023

Related U.S. Application Data

(63) Continuation of application No. 17/261,705, filed as application No. PCT/KR2019/012623 on Sep. 27, 2019, now Pat. No. 11,622,390.

(30) Foreign Application Priority Data

Sep. 28, 2018 (KR) .................. 10-2018-0115550

(51) Int. Cl.
*H04W 74/0833* (2024.01)
*H04W 72/23* (2023.01)

(52) U.S. Cl.
CPC ....... *H04W 74/0833* (2013.01); *H04W 72/23* (2023.01)

(58) Field of Classification Search
None
See application file for complete search history.

(56) References Cited

U.S. PATENT DOCUMENTS

2009/0135769 A1 5/2009 Sambhwani et al.
2011/0292895 A1 12/2011 Wager et al.
(Continued)

FOREIGN PATENT DOCUMENTS

EP 3849271 7/2021
KR 10-2010-0036953 4/2010
(Continued)

OTHER PUBLICATIONS

PCT International Application No. PCT/KR2019/012623, International Search Report dated Jan. 9, 2020, 2 pages.
(Continued)

*Primary Examiner* — Jamaal Henson
(74) *Attorney, Agent, or Firm* — LEE, HONG, DEGERMAN, KANG & WAIMEY

(57) ABSTRACT

A method and apparatus for determining whether to perform transmission on a random access or a configured grant in wireless communication system is provided. The wireless device leaves a connected state with a network. The wireless device determines whether to perform transmission on a random access (RA) or a configured grant based on data available for transmission, wherein the configured grant is received from the network. The wireless device performs the transmission of the data based on the determination.

14 Claims, 15 Drawing Sheets

(56) References Cited

U.S. PATENT DOCUMENTS

| | | | |
|---|---|---|---|
| 2012/0208527 A1 | 8/2012 | Park | |
| 2013/0343319 A1 | 12/2013 | Quan et al. | |
| 2016/0014815 A1 | 1/2016 | Vajapeyam et al. | |
| 2018/0152907 A1 | 5/2018 | Zhang et al. | |
| 2018/0288746 A1 | 10/2018 | Zhang et al. | |
| 2018/0295651 A1 | 10/2018 | Cao et al. | |
| 2018/0368157 A1 | 12/2018 | Jeon et al. | |
| 2019/0104564 A1 | 4/2019 | Johansson et al. | |
| 2019/0174554 A1 | 6/2019 | Deenoo et al. | |
| 2019/0254052 A1 | 8/2019 | Liu et al. | |
| 2019/0320467 A1 | 10/2019 | Freda et al. | |
| 2020/0107396 A1* | 4/2020 | Wang | H04W 72/23 |
| 2020/0137760 A1* | 4/2020 | Shih | H04W 72/21 |
| 2020/0137761 A1* | 4/2020 | Shih | H04W 76/27 |
| 2020/0267696 A1 | 8/2020 | Li et al. | |
| 2020/0367290 A1 | 11/2020 | Mazloum et al. | |
| 2021/0243777 A1* | 8/2021 | Tsai | H04W 74/006 |
| 2021/0298085 A1 | 9/2021 | Lee et al. | |

FOREIGN PATENT DOCUMENTS

| | | |
|---|---|---|
| KR | 10-2018-0035719 | 4/2018 |
| WO | 2018031603 A1 | 2/2018 |
| WO | 2018031603 A8 | 2/2018 |
| WO | 2018-174595 | 9/2018 |
| WO | 2019215675 | 11/2019 |

OTHER PUBLICATIONS

Huawei et al., "On support for transmission in preconfigured UL resources," 3GPP TSG RAN WG1 Meeting#94, R1-1808108, Aug. 2018, 8 pages.

LG Electronics, "Discussion on preconfigured UL resources in NB-IoT," 3GPP TSG RAN WG1 Meeting#94, R1-1808475, Aug. 2018, 7 pages.

Nokia et al., "Msg3 buffer handlling upon CE level change for EDT attempt," 3GPP TSG-RAN WG2 Meeting #103, R2-1814408, Oct. 2018, 4 pages.

3rd Generation Partnership Project, "Technical Specification Group Radio Access Network; Evolved Universal Terrestrial Radio Access (E-UTRA); Medium Access Control (MAC) protocol specification (Release 15)," Sections 5.2 and 5.10 of 3GPP TS 36.321 V15.2.0, Jul. 2018, 126 pages.

3rd Generation Partnership Project, "Technical Specification Group Radio Access Network; NR; Medium Access Control (MAC) protocol specification (Release 15)," Section 5.8.2 of 3GPP TS 38.321 V15.3.0, Sep. 2018, 76 pages.

3rd Generation Partnership Project, "Technical Specification Group Radio Access Network; NR; Radio Resource Control (RRC) protocol specification (Release 15)," Section 5.3 of 3GPP TS 38.331 V15.3.0, Sep. 2018, 445 pages.

United States Patent and Trademark Office U.S. Appl. No. 17/261,705, Office Action dated Apr. 1, 2022, 21 pages.

United States Patent and Trademark Office U.S. Appl. No. 17/261,705, Final Office Action dated Aug. 2, 2022, 15 pages.

United States Patent and Trademark Office U.S. Appl. No. 17/261,705, Notice of Allowance dated Nov. 23, 2022, 9 pages.

European Patent Office Application Serial No. 19864456.9, Search Report dated Jul. 12, 2021, 13 pages.

Nokia et al., "Preconfigured Grant for Uplink transmission," R1-1808440, 3GPP TSG RAN WG1 Meeting #94, Aug. 2018, 4 pages.

Media Tek Inc. et al., "Early Data Transmission on Preconfigured UL Resources in NB-IoT," R1-1808960, 3GPP TSG RAN WG1 Meeting #94, Aug. 2018, 4 pages.

* cited by examiner

METHOD AND APPARATUS FOR DETERMINING WHETHER TO PERFORM TRANSMISSION ON A RANDOM ACCESS OR A CONFIGURED GRANT IN WIRELESS COMMUNICATION SYSTEM

CROSS-REFERENCE TO RELATED APPLICATIONS

This application is a continuation of U.S. patent application Ser. No. 17/261,705, filed on Jan. 20, 2021, which is the National Stage filing under 35 U.S.C. 371 of International Application No. PCT/KR2019/012623, filed on Sep. 27, 2019, which claims the benefit of earlier filing date and right of priority to Korean Application No. 10-2018-0115550, filed on Sep. 28, 2018, the contents of which are all hereby incorporated by reference herein their entirety.

TECHNICAL FIELD

The present disclosure relates to a method and an apparatus for determining whether to perform transmission on a random access or a configured grant in wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in R3l-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

A mechanism for transmission of a wireless device while in leaving a connected has been studied. A wireless device may use a pre-allocated resource, such as configured grant, for transmission. This mechanism could improve the device battery life and reduce the resource for transmission.

SUMMARY

A wireless device may transmit data while in leaving a connected state by using EDT on a Random Access procedure. In addition, a wireless device may transmit user data with a configured grant while in leaving the connected state. However, a wireless device could not decide whether to perform transmission on a random access (RA) or a configured grant.

In an aspect, a method performed by a wireless device in a wireless communication system is provided. The method includes leaving a connected state with a network. The method includes determining whether to perform transmission on a random access (RA) or a configured grant based on data available for transmission, wherein the configured grant is received from the network. The method includes performing the transmission of the data based on the determination.

In another aspect, a wireless device in a wireless communication system is provided. The wireless device includes a memory, a transceiver, and a processor, operably coupled to the memory and the transceiver. The processor is configured to leave a connected state with a network. The processor is configured to determine whether to perform transmission on a random access (RA) or a configured grant based on data available for transmission, wherein the configured grant is received from the network. The processor is configured to perform the transmission of the data based on the determination.

The present disclosure can have various advantageous effects.

According to some embodiments of the present disclosure, the wireless device could decide whether to perform data transmission with configured grant or with Early Data Transmission while in RRC_IDLE and/or RRC_INACTIVE, when the wireless device is configured with both of a configured grant and Early Data Transmission for transmitting user data in RRC_IDLE and/or RRC_INACTIVE.

According to some embodiments of the present disclosure, the wireless device could decide whether to perform data transmission on RA or a configured grant, by considering a data available for transmission (for example, amount of the data available), while in leaving a connected state with a network.

According to some embodiments of the present disclosure, a wireless device could transmit the data available efficiently, since the wireless device may perform data transmission based on either of configured grant or Early Data transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
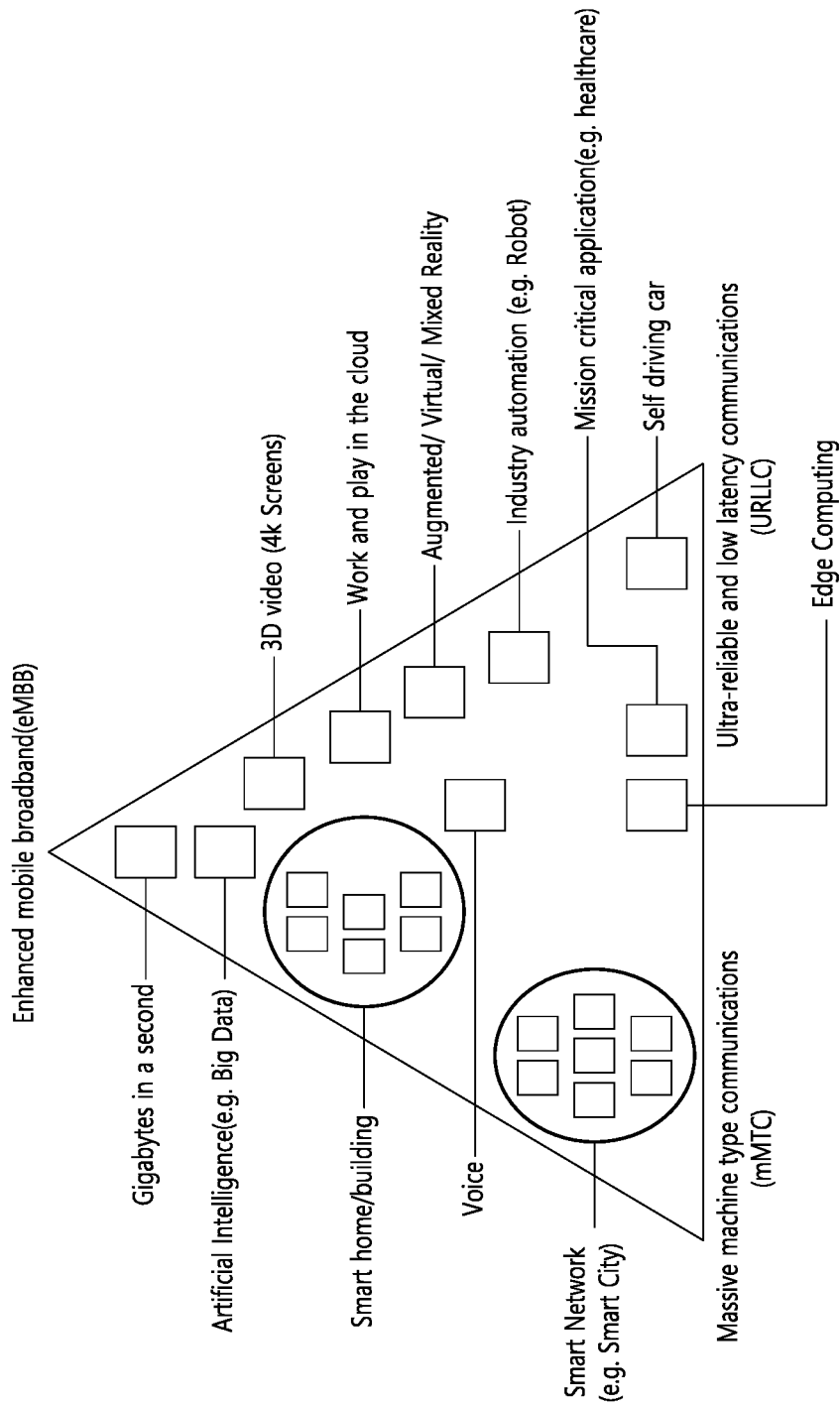
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
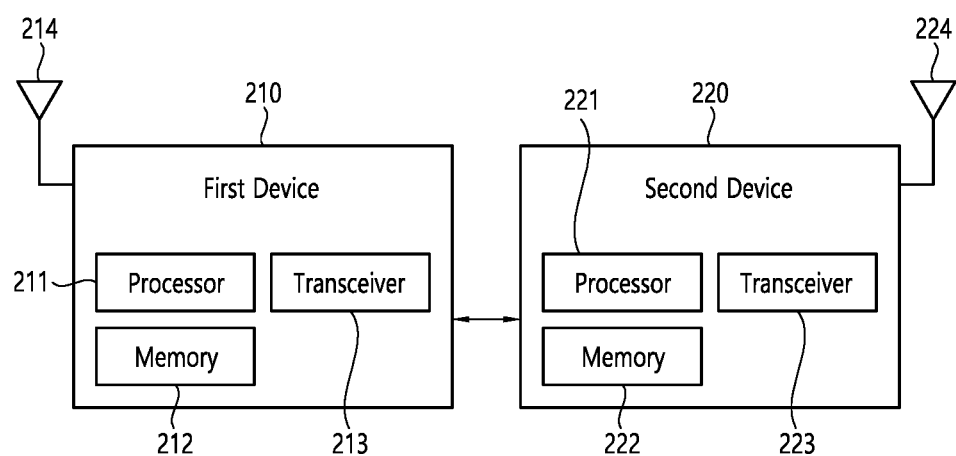
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
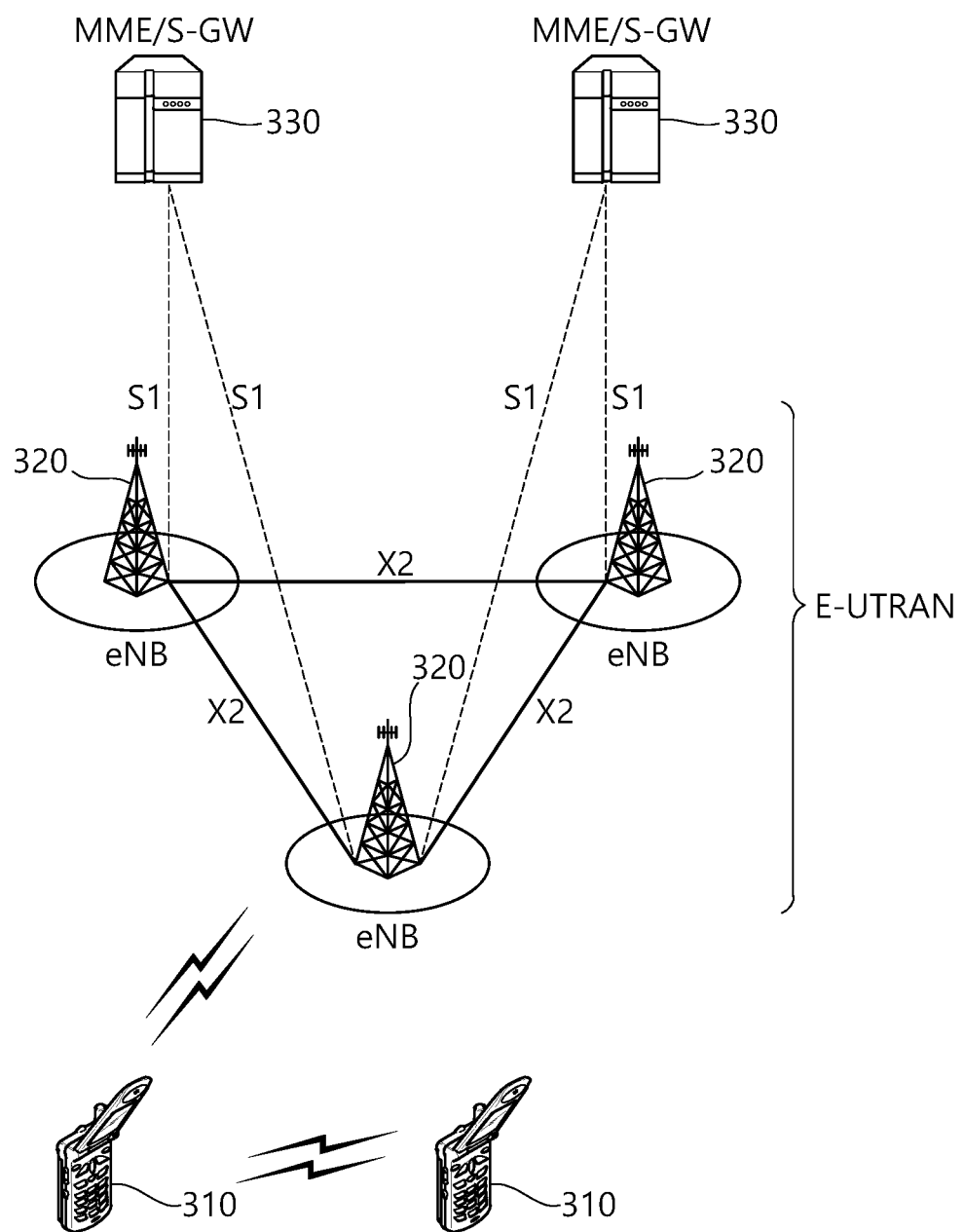
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
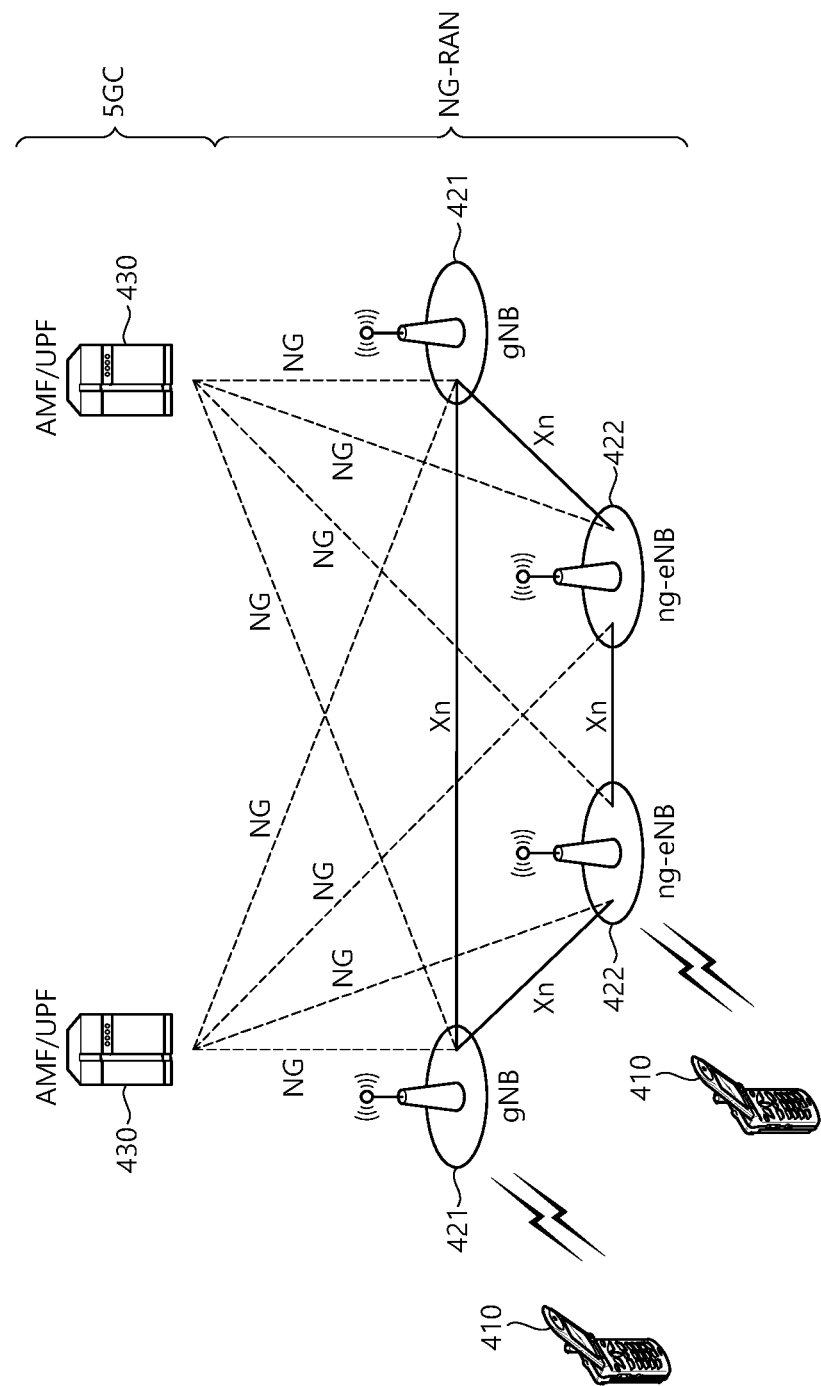
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
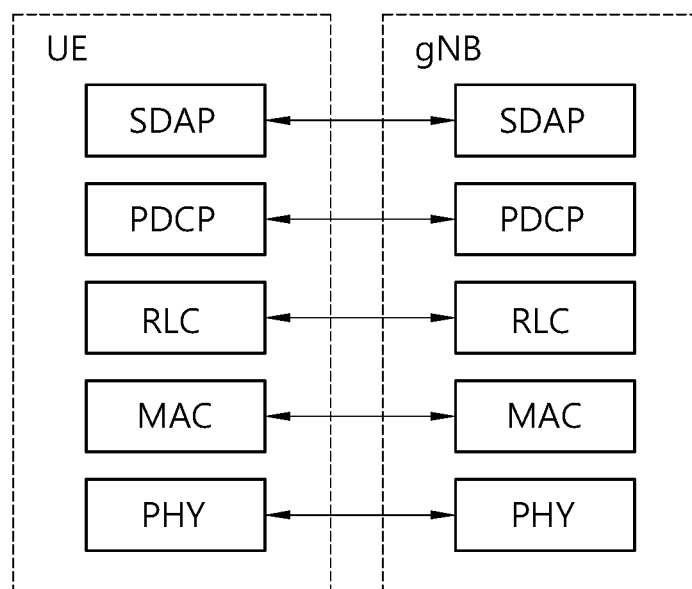
FIG. 5 shows a block diagram of a user plane protocol stack to which the technical features of the present disclosure can be applied.
Figure 6:
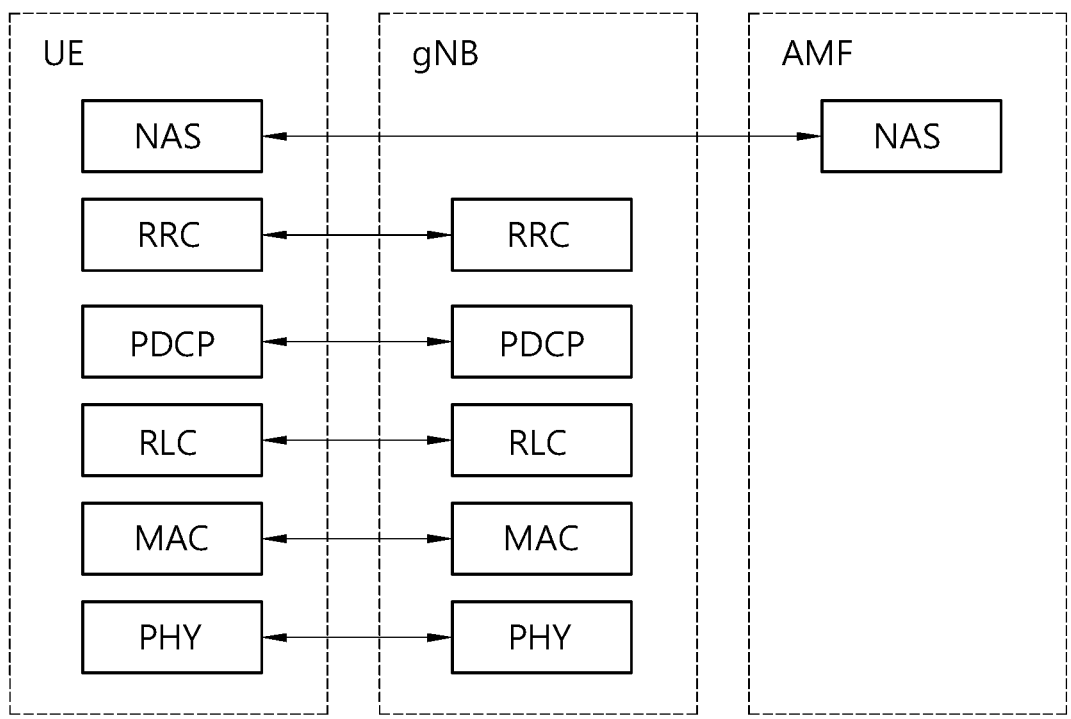
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, random access procedure, by a wireless device, will be described. It may be referred to as Section 5.2 of 3GPP TS 36.321 V15.2.0 (2018-07). The Random Access procedure is initiated by a PDCCH order, by the MAC sublayer itself or by the RRC sublayer. Random Access procedure on a SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated, and for Random Access on a SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

The following information for related Serving Cell is assumed to be available before the procedure can be initiated for NB-IoT UEs, BL UEs or UEs in enhanced coverage:
 1> if the UE is a BL UE or a UE in enhanced coverage:
  2> the available set of PRACH resources associated with each enhanced coverage level supported in the Serving Cell for the transmission of the Random Access Preamble, prach-ConfigIndex.
  2> for Early Data Transmission (EDT), the available set of PRACH resources associated with EDT for each enhanced coverage level supported in the Serving Cell for the transmission of the Random Access Preamble, prach-ConfigIndex.
  2> the groups of Random Access Preambles and the set of available Random Access Preambles in each group (SpCell only):
   2> If sizeOfRA-PreamblesGroupA is not equal to numberOfRA-Preambles:
    3> Random Access Preambles group A and B exist and are calculated as above;
   2> else:
    3> the preambles that are contained in Random Access Preamble groups for each enhanced coverage level, if it exists, are the preambles firstPreamble to lastPreamble.
  NOTE: When a PRACH resource is shared for multiple enhanced coverage levels, and enhanced coverage levels are differentiated by different preamble indices, Group A and Group B is not used for this PRACH resource.
 1> if the UE is an NB-IoT UE:
  2> the available set of PRACH resources supported in the Serving Cell on the anchor carrier, nprach-ParametersList, and on the non-anchor carriers, in ul-ConfigList.
  2> for EDT, the available set of PRACH resources associated with EDT on anchor carrier, nprach-ParametersList-EDT, and on the non-anchor carriers, in ul-ConfigList.
  2> for random access resource selection and preamble transmission:
   3> a PRACH resource is mapped into an enhanced coverage level.
   3> each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers. Each group is referred to as a Random Access Preamble group below in the procedure text.
    4> a subcarrier is identified by the subcarrier index in the range:
    [nprach-SubcarrierOffset, nprach-SubcarrierOffset+nprach-NumSubcarriers−1]
    4> each subcarrier of a Random Access Preamble group corresponds to a Random Access Preamble.
   3> when the subcarrier index is explicitly sent from the eNB as part of a PDCCH order ra-PreambleIndex shall be set to the signalled subcarrier index.
   3> the mapping of the PRACH resources into enhanced coverage levels is determined according to the following:
    3> the number of enhanced coverage levels is equal to one plus the number of RSRP thresholds present in rsrp-ThresholdsPrachInfoList.
    3> each enhanced coverage level has one anchor carrier PRACH resource present in nprach-ParametersList and zero or one PRACH resource for each non-anchor carrier signalled in ul-ConfigList.
    3> for EDT, each enhanced coverage level has zero or one anchor carrier PRACH resource present in nprach-ParametersList-EDT and zero or one PRACH resource for each non-anchor carrier signalled in ul-ConfigList.
    3> enhanced coverage levels are numbered from 0 and the mapping of PRACH resources to enhanced coverage levels are done in increasing numRepetitionsPerPreambleAttempt order.
    3> when multiple carriers provide PRACH resources for the same enhanced coverage level, the UE will randomly select one of them using the following selection probabilities:
     4> the selection probability of the anchor carrier PRACH resource for the given enhanced coverage level, nprach-ProbabilityAnchor, is given by the corresponding entry in nprach-ProbabilityAnchorList 4> the selection probability is equal for all non-anchor carrier PRACH resources and the probability of selecting one PRACH resource on a given non-anchor carrier is (1−nprach-ProbabilityAnchor)/(number of non-anchor NPRACH resources)

1> the criteria to select PRACH resources based on RSRP measurement per enhanced coverage level supported in the Serving Cell rsrp-ThresholdsPrachInfoList.

1> the maximum number of preamble transmission attempts per enhanced coverage level supported in the Serving Cell maxNumPreambleAttemptCE.

1> the number of repetitions required for preamble transmission per attempt for each enhanced coverage level supported in the Serving Cell numRepetitionPerPreambleAttempt.

1> the configured UE transmitted power of the Serving Cell performing the Random Access Procedure, PCMAX.

1> the RA response window size ra-ResponseWindowSize and the Contention Resolution Timer mac-ContentionResolutionTimer (SpCell only) per enhanced coverage level supported in the Serving Cell.

1> for EDT, the Contention Resolution Timer mac-ContentionResolutionTimer configured for EDT (SpCell only) per enhanced coverage level supported in the Serving Cell.

1> the power-ramping factor powerRampingStep and optionally powerRampingStepCE1.

1> the maximum number of preamble transmission preambleTransMax-CE.

1> the initial preamble power preambleInitialReceivedTargetPower and optionally preambleInitialReceivedTargetPowerCE1.

1> the preamble format based offset DELTA PREAMBLE. For NB-IoT the DELTA PREAMBLE is set to 0.

1> for NB-IoT, the use of contention free random access ra-CFRA-Config.

The Random Access Resource selection procedure shall be performed as follows:

1> For BL UEs or UEs in enhanced coverage or NB-IoT UEs, if EDT is initiated by the upper layers:
2> if the message size (UL data available for transmission plus MAC header and, where required, MAC control elements) is larger than the TB size signalled in edt-TBS for the selected enhanced coverage level for EDT; or
2> if the PRACH resource associated with EDT for the selected enhanced coverage level is not available:
3> indicate to upper layers that EDT is cancelled;

1> For BL UEs or UEs in enhanced coverage, select the PRACH resource set corresponding to the selected enhanced coverage level. For EDT, the PRACH resource set shall correspond to the set associated with EDT for the selected enhanced coverage level.

1> If, except for NB-IoT, ra-PreambleIndex (Random Access Preamble) and ra-PRACH-MaskIndex (PRACH Mask Index) have been explicitly signalled and ra-PreambleIndex is not 000000:
2> the Random Access Preamble and the PRACH Mask Index are those explicitly signaled.

1> else the Random Access Preamble shall be selected by the MAC entity as follows:
2> For BL UEs or UEs in enhanced coverage, if EDT is started, select the Random Access Preambles group corresponding to PRACH resource for EDT for the selected enhanced coverage level. Otherwise, if Random Access Preamble group B does not exist, select the Random Access Preambles group corresponding to the selected enhanced coverage level.

2> For NB-IoT, randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group. For EDT, the PRACH resource shall correspond to resource associated with EDT for the selected enhanced coverage level.

Hereinafter, Maintenance of Uplink Time Alignment, by a wireless device, will be described. It may be referred to as Section 5.2 of 3GPP TS 36.321 V15.2.0 (2018-07).

The MAC entity has a configurable timer timeAlignmentTimer per TAG. The timeAlignmentTimer is used to control how long the MAC entity considers the Serving Cells belonging to the associated TAG to be uplink time aligned. The MAC entity shall:

1> when a Timing Advance Command MAC control element is received and if a $N_{TA}$ has been stored or maintained with the indicated TAG:
2> apply the Timing Advance Command for the indicated TAG;
2> start or restart the timeAlignmentTimer associated with the indicated TAG.

1> when a Timing Advance Command is received in a Random Access Response message for a serving cell belonging to a TAG:
2> if the Random Access Preamble was not selected by the MAC entity:
3> apply the Timing Advance Command for this TAG;
3> start or restart the timeAlignmentTimer associated with this TAG.
2> else, if the timeAlignmentTimer associated with this TAG is not running:
3> apply the Timing Advance Command for this TAG;
3> start the timeAlignmentTimer associated with this TAG;
3> when the contention resolution is considered not successful, stop timeAlignmentTimer associated with this TAG.
2> else:
3> ignore the received Timing Advance Command.

1> when the MAC entity is configured with rach-Skip or rach-SkipSCG:
2> apply timing advance value indicated by targetTA in rach-Skip or rach-SkipSCG for the pTAG;
2> start the timeAlignmentTimer associated with this TAG.

1> when a timeAlignmentTimer expires:
2> if the timeAlignmentTimer is associated with the pTAG:
3> flush all HARQ buffers for all serving cells;
3> notify RRC to release PUCCH/SPUCCH for all serving cells;
3> notify RRC to release SRS for all serving cells;
3> for NB-IoT, notify RRC to release all dedicated resources for SR;
3> clear any configured downlink assignments and uplink grants;
3> consider all running timeAlignmentTimers as expired;
2> else if the timeAlignmentTimer is associated with an sTAG, then for all Serving Cells belonging to this TAG:
3> flush all HARQ buffers;
3> notify RRC to release SRS;

3> notify RRC to release PUCCH/SPUCCH, if configured;

3> clear any configured downlink assignments and uplink grants.

When the MAC entity stops uplink transmissions for an SCell due to the fact that the maximum uplink transmission timing difference or the maximum uplink transmission timing difference the UE can handle between TAGS of any MAC entity of the UE is exceeded, the MAC entity considers the timeAlignmentTimer associated with the SCell as expired.

The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

The MAC entity shall not perform any sidelink transmission which is performed based on UL timing of the corresponding serving cell and any associated SCI transmissions when the corresponding timeAlignmentTimer is not running.

NOTE: A MAC entity stores or maintains $N_{TA}$ upon expiry of associated timeAlignmentTimer. The MAC entity applies a received Timing Advance Command MAC control element and starts associated timeAlignmentTimer also when the timeAlignmentTimer is not running.

Hereinafter, Semi-Persistent Scheduling, by a wireless device, will be described. It may be referred to as Section 5.10 of 3GPP TS 36.321 V15.2.0 (2018-07).

Multiple UL Semi-Persistent Scheduling configurations are supported per Serving Cell. On one Serving Cell, multiple such configurations can be active simultaneously only for the same TTI length. Multiple configurations can also be active simultaneously on different Serving Cells.

When Semi-Persistent Scheduling is enabled by RRC:
1> Semi-Persistent Scheduling C-RNTI or UL Semi-Persistent Scheduling V-RNTI;
1> Uplink Semi-Persistent Scheduling interval semiPersistSchedIntervalUL if short TTI in UL for the SpCell is not configured or semiPersistSchedIntervalUL-sTTI in UL for the SpCell if short TTI is configured and number of empty transmissions before implicit release implicitReleaseAfter, if Semi-Persistent Scheduling with Semi-Persistent Scheduling C-RNTI is enabled for the uplink;
1> Uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink;
1> Whether twoIntervalsConfig is enabled or disabled for uplink, only for TDD;
1> Downlink Semi-Persistent Scheduling interval semiPersistSchedIntervalDL if short TTI in DL for the SpCell is not configured or semiPersistSchedIntervalDL-sTTI if short TTI in DL for the SpCell is configured and number of configured HARQ processes for Semi-Persistent Scheduling numberOfConfSPS-Processes, if Semi-Persistent Scheduling is enabled for the downlink;
1> sTTIStartTimeDl if short TTI in DL for the SpCell is configured and sTTIStartTimeUl if short TTI in UL for the SpCell is configured;

When Semi-Persistent Scheduling for uplink or downlink is disabled by RRC, the corresponding configured grant or configured assignment shall be discarded.

Semi-Persistent Scheduling is not supported for RN communication with the E-UTRAN in combination with an RN subframe configuration.

NOTE: When eIMTA is configured, if a configured uplink grant or a configured downlink assignment occurs on a subframe that can be reconfigured through eIMTA L1 signalling, then the UE behaviour is left unspecified.

Hereinafter, Downlink and Uplink of Semi-Persistent Scheduling, by a wireless device, will be described.

After a Semi-Persistent downlink assignment is configured, the MAC entity shall consider sequentially that the Nth assignment occurs in the TTI for which:
1> subframe SPS is used:
2> (10*SFN+subframe)=[(10*SFNstart time+subframestart time)+N*semiPersistSchedIntervalDL] modulo 10240.
1> slot or subslot SPS is used:
2> (10*SFN*sTTI_Number_Per_Subframe+subframe sTTI_Number_Per_Subframe+sTTI_number)=[(10*SFNstart time sTTI_Number_Per_Subframe+subframestart time*sTTI_Number_Per_Subframe+sTTIStartTimeDl)+ N*semiPersistSchedIntervalDL-sTTI] modulo (10240*sTTI_Number_Per_Subframe).

Where SFNstart time, subframestart time and sTTIStartTimeDl are the SFN, subframe and sTTI_number, respectively, at the time the configured downlink assignment were (re-)initialised. The sTTI_Number_Per_Subframe is 6 when subslot TTI is configured and 2 when slot TTI is configured for short TTI operation. sTTI_number refers to the index of the short TTI, i.e., index of subslot or slot within the subframe.

For BL UEs or UEs in enhanced coverage SFNstart time and subframestart time refer to SFN and subframe of the first transmission of PDSCH where configured downlink assignment was (re-)initialized.

After a Semi-Persistent Scheduling uplink grant is configured, the MAC entity shall:
1> if twoIntervalsConfig is enabled by upper layer:
2> set the Subframe Offset.
1> else:
2> set Subframe Offset to 0.
1> consider sequentially that the Nth grant occurs in the TTI for which:
2> subframe SPS is used:
3> (10*SFN+subframe)=[(10*SFNstart time+subframestart time)+N*semiPersistSchedIntervalUL+Subframe Offset*(N modulo 2)] modulo 10240.
2> slot or subslot SPS is used:
3> (10*SFN*sTTI_Number_Per_Subframe+subframe sTTI_Number_Per_Subframe+sTTI_number)= [(10*SFNstart time sTTI_Number_Per_Subframe+ subframestart time*sTTI_Number_Per_Subframe+ sTTIStartTimeUl)+N*semiPersistSchedIntervalUL-sTTI+Subframe Offset*(N modulo 2)*sTTI_Number_Per_Subframe] modulo (10240*sTTI_Number_Per_Subframe).

Where SFNstart time, subframestart time and sTTIStartTimeUl are the SFN, subframe and sTTI_number, respectively, at the time the configured uplink grant were (re-)initialised. The sTTI_Number_Per_Subframe is 6 when subslot TTI is configured and 2 when slot TTI is configured for short TTI operation. sTTI_number refers to the index of the short TTI, i.e., index of subslot or slot within the subframe.

Except for NB-IoT, for TDD, the MAC entity is configured with semiPersistSchedIntervalUL shorter than 10 subframes, the Nth grant shall be ignored if it occurs in a downlink subframe or a special subframe.

Except for NB-IoT, if the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

If SPS confirmation has been triggered and not cancelled:
1> if the MAC entity has UL resources allocated for new transmission for this TTI:
2> instruct the Multiplexing and Assembly procedure to generate an SPS confirmation MAC Control Element;
2> cancel the triggered SPS confirmation.

The MAC entity shall clear the configured uplink grant immediately after first transmission of SPS confirmation MAC Control Element triggered by the SPS release.

NOTE: Retransmissions for Semi-Persistent Scheduling can continue after clearing the configured uplink grant.

For NB-IoT UEs, BL UEs or UEs in enhanced coverage SFNstart time and subframestart time refer to SFN and subframe of the first transmission of PUSCH where configured uplink grant was (re-)initialized.

In the event of a resource conflict between multiple UL SPS configurations configured with Uplink Semi-Persistent Scheduling V-RNTI, the UE behavior is undefined.

For NB-IoT UEs, a configured uplink grant shall be used only for BSR transmission and uplink skip mechanism is implicitly supported.

Hereinafter, uplink transmission without dynamic scheduling, by a wireless device, will be described. It may be referred to as Section 5.8.2 of 3GPP TS 38.321 V15.3.0 (2018-09).

There are two types of transmission without dynamic grant:
configured grant Type 1 where an uplink grant is provided by RRC, and stored as configured uplink grant;
configured grant Type 2 where an uplink grant is provided by PDCCH, and stored or cleared as configured uplink grant based on L1 signalling indicating configured uplink grant activation or deactivation.

Type 1 and Type 2 are configured by RRC per Serving Cell and per BWP. Multiple configurations can be active simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength (i.e. SLIV);
nrofHARQ-Processes: the number of HARQ processes for configured grant.

RRC configures the following parameters when the configured grant Type 2 is configured:
cs-RNTI: CS-RNTI for activation, deactivation, and retransmission;
periodicity: periodicity of the configured grant Type 2;
nrofHARQ-Processes: the number of HARQ processes for configured grant.

Upon configuration of a configured grant Type 1 for a Serving Cell by upper layers, the MAC entity shall:
1> store the uplink grant provided by upper layers as a configured uplink grant for the indicated Serving Cell;
1> initialise or re-initialise the configured uplink grant to start in the symbol according to timeDomainOffset and S (derived from SLIV), and to reoccur with periodicity.

When a configured uplink grant is released by upper layers, all the corresponding configurations shall be released and all corresponding uplink grants shall be cleared.

The MAC entity shall:
1> if the configured uplink grant confirmation has been triggered and not cancelled; and
1> if the MAC entity has UL resources allocated for new transmission:
2> instruct the Multiplexing and Assembly procedure to generate an Configured Grant Confirmation MAC CE;
2> cancel the triggered configured uplink grant confirmation.

For a configured grant Type 2, the MAC entity shall clear the configured uplink grant immediately after first transmission of Configured Grant Confirmation MAC CE triggered by the configured uplink grant deactivation.

Retransmissions except for repetition of configured uplink grants use uplink grants addressed to CS-RNTI.

The RRC inactive state is described in detail. The following description of the RRC inactive state will be described by taking NR as an example, but it can be applied to LTE-A without loss of generality. For example, in the following description, NG-RAN node/gNB may be replaced with eNB and/or more generally BS, and AMF may be replaced with MME.

The RRC inactive state applies to NG-RAN node. The AMF, based on network configuration, may provide RRC inactive assistance information to the NG-RAN node, to assist the NG-RAN's decision whether the UE can be sent to RRC inactive state.

The RRC inactive assistance information includes at least one of the followings.
UE specific DRX values
The registration area provided to the UE
Periodic registration update timer
If the AMF has enabled mobile initiated connection only (MICO) mode for the UE, an indication that the UE is in MICO mode.
Information from the UE permanent identifier that allows the NG-RAN node to calculate the UE's RAN paging occasions.

The RRC inactive assistance information mentioned above is provided by the AMF during N2 activation with the (new) serving NG-RAN node (i.e. during registration, service request, handover) to assist the NG-RAN node's decision whether the UE can be sent to RRC inactive state. RRC inactive state is part of RRC state machine, and it is up to the NG-RAN node to determine the conditions to enter RRC inactive state. If any of the parameters included in the RRC inactive assistance information changes as the result of NAS procedure, the AMF shall update the RRC inactive assistance information to the NG-RAN node.

When the UE is in connection management connected state (CM-CONNECTED), if the AMF has provided RRC inactive assistance information, the NG-RAN node may decide to move a UE to CM-CONNECTED with RRC inactive state.

The state of the N2 and N3 reference points are not changed by the UE entering CM-CONNECTED with RRC inactive state. A UE in RRC inactive state is aware of the RAN notification area.

The 5GC network is not aware of the UE transitions between CM-CONNECTED with RRC_CONNECTED and CM-CONNECTED with RRC inactive state, unless the 5GC network is notified via N2 notification procedure.

At transition into CM-CONNECTED with RRC inactive state, the NG-RAN node configures the UE with a periodic RAN notification area update timer taking into account the value of the periodic registration update timer value indicated in the RRC inactive assistance information, and uses a guard timer with a value longer than the RAN notification area update timer value provided to the UE.

If the periodic RAN notification area update guard timer expires in NG-RAN node, the NG-RAN node shall initiate access network (AN) release procedure.

When the UE is in CM-CONNECTED with RRC inactive state, the UE performs PLMN selection procedures for connection management idle state (CM-IDLE).

When the UE is CM-CONNECTED with RRC inactive state, the UE may resume the RRC connection due to at least one of the followings.
- UL data pending
- Mobile originated (MO) NAS signaling procedure
- As a response to RAN paging
- Notifying the network that it has left the RAN notification area
- Upon periodic RAN update timer expiration.

If the UE resumes the connection in a different NG-RAN node within the same PLMN, the UE AS context is retrieved from the old NG-RAN node and a procedure is triggered towards the CN.

If the RAN paging procedure is not successful in establishing contact with the UE, the procedure shall be handled by the network as follows.
- If NG-RAN node has at least one pending NAS PDU for transmission, the NG-RAN node shall initiate the AN release procedure to move the UE CM state in the AMF to CM-IDLE and indicate to the AMF the NAS non-delivery.
- If NG-RAN node has only pending user plane data for transmission, the NG-RAN node may keep the N2 connection active or initiate the AN release procedure based on local configuration in NG-RAN node.

The user plane data which triggers the RAN paging can be lost, e.g. in the case of RAN paging failure.

If a UE in CM-CONNECTED with RRC inactive state performs cell selection to GERAN/UTRAN/E-UTRAN, it shall follow idle mode procedures of the selected RAT.

In addition, a UE in CM-CONNECTED state with RRC inactive state shall enter CM-IDLE and initiates the NAS signaling recovery in at least one of the following cases.
- If RRC resume procedure fails;
- If the UE receives core network paging;
- If the periodic RAN notification area update timer expires and the UE cannot successfully resume the RRC connection;
- In any other failure scenario that cannot be resolved in RRC inactive state and requires the UE to move to CM-IDLE.

When the UE is in CM-CONNECTED with RRC inactive state, if NG-RAN node has received location reporting control message from AMF with the reporting type indicating single stand-alone report, the NG-RAN node shall perform RAN paging before reporting the location to AMF.

When the UE is in CM-CONNECTED with RRC inactive state, if NG-RAN node has received location reporting control message from AMF with the reporting type indicating continuously reporting whenever the UE changes cell, the NG-RAN node shall send a location report message to AMF including UE's last known location with time stamp.

When the UE is CM-CONNECTED with RRC inactive state, if the AMF receives Nudm_UEContextManagement_DeregistrationNotification from user data management (UDM), the AMF shall initiate AN release procedure.

When UE is in CM-CONNECTED with RRC inactive state, if NG-RAN node has received location reporting control message from AMF with the reporting type of the area of interest based reporting, the NG-RAN node shall send a location report message to AMF including UE presence in the area of interest (i.e. IN, OUT, or UNKNOWN) and the UE's last known location with time stamp.

Figure 7:
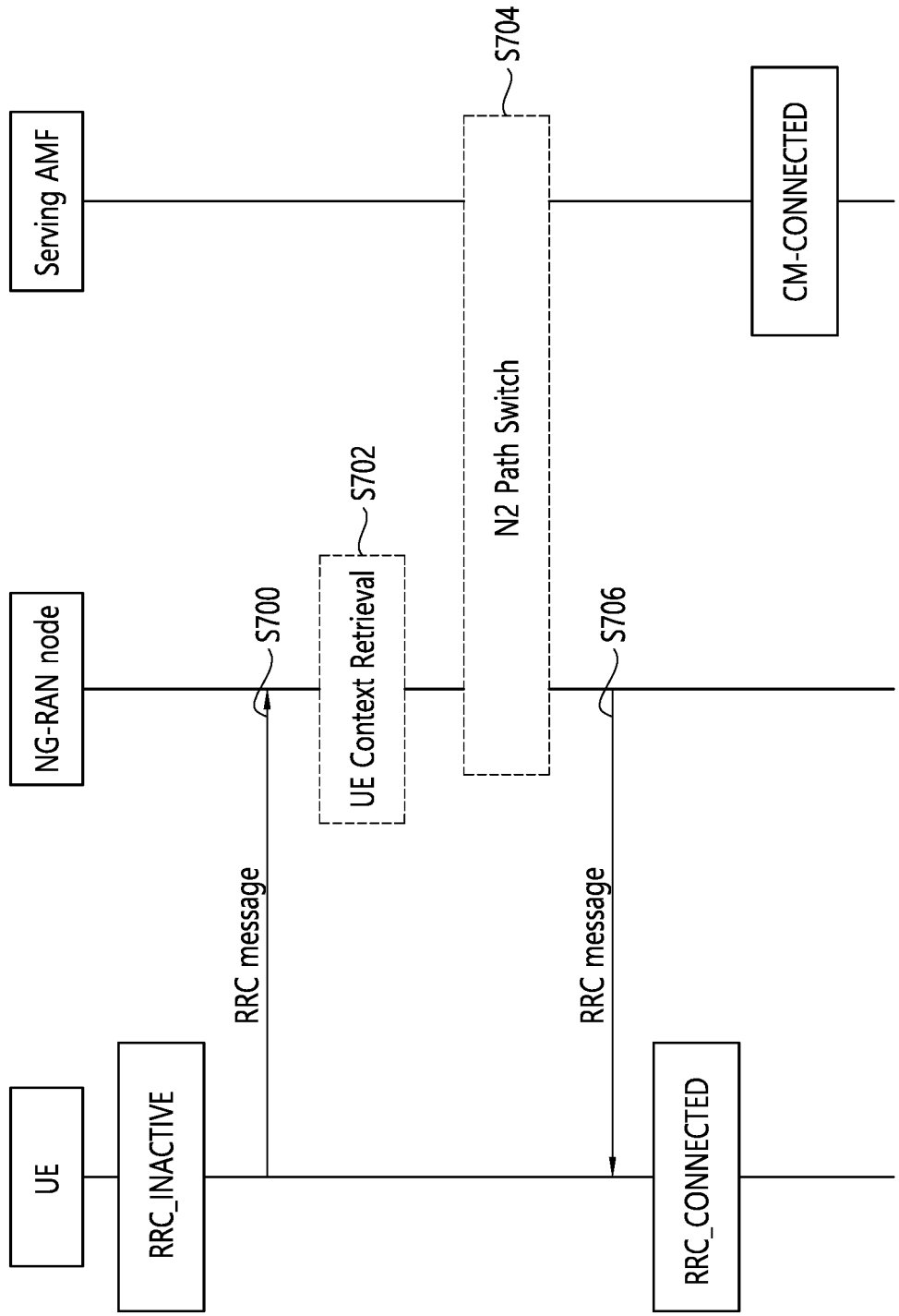
FIG. 7 shows an example of a connection resume procedure to which the technical features of the present disclosure can be applied.

FIG. 7 shows an example of a connection resume procedure to which the technical features of the present disclosure can be applied. The connection resume procedure is used by the UE to perform RRC inactive to RRC connected state transition.

In step S700, while the UE is in RRC_INACTIVE, the UE transmits an RRC message to the NG-RAN node to initiate the transition from RRC_INACTIVE to RRC_CONNECTED. The UE provides its resume ID needed by the NG-RAN node to access the UE's stored context. The RRC message may be RRCConnectionResumeRequest message which will be described in detail below.

In step S702, the NG-RAN node may conditionally perform UE context retrieval. The UE context retrieval is performed when the UE context associated with the UE attempting to resume its connection is not locally available at the accessed NG-RAN node.

In step S704, the NG-RAN node may conditionally perform N2 path switch procedure towards the serving AMF. If the target NG-RAN node is different from the old NG-RAN node, the serving NG-RAN node initiates N2 path switch procedure and including Xn data forwarding. The NG-RAN node sends UE notification message to report that the UE is in RRC_CONNECTED if the AMF requested N2 notification to the NG-RAN node.

In step S706, the NG-RAN node transmits an RRC message to the UE to confirm to the UE that the UE has entered RRC_CONNECTED. The RRC message includes resume ID of the UE.

Table 3 shows an example of RRCConnectionResumeRequest message. The RRCConnectionResumeRequest message may be the RRC message which is transmitted in step S700 of FIG. 7. The RRCConnectionResumeRequest message is used to request the resumption of a suspended RRC connection. The SRB for the RRCConnectionResumeRequest message may be SRB0. The RRCConnectionResumeRequest message may be transmitted via logical channel CCCH.

TABLE 3

```
--ASN1START
RRCConnectionResumeRequest-r13 ::=    SEQUENCE {
    criticalExtensions                CHOICE {
        rrcConnectionResumeRequest-r13        RRCConnectionResumeRequest-r13 -
IEs,
        criticalExtensionsFuture      SEQUENCE { }
    }
}
```

TABLE 3-continued

```
RRCConnectionResumeRequest-r13-IEs ::= SEQUENCE {
    resumeIdentity-r13                    CHOICE {
        resumeID-r13                          ResumeIdentity-r13,
        truncatedResumeID-r13                 BIT STRING (SIZE (24))
    },
    shortResumeMAC-I-r13                  BIT STRING (SIZE (16)),
    resumeCause-r13                       ResumeCause,
    spare                                 BIT STRING (SIZE (1))
}
ResumeCause ::= ENUMERATED {
                emergency, highPriorityAccess, mt-Access, mo-Signalling,
                mo-Data,   delayTolerantAccess-v1020,  mo-VoiceCall-v1280,
spare1}
--ASN1STOP
```

Referring to Table 3, the resumeCause field provides the resume cause for the RRC connection resume request as provided by the upper layers. The resumeIdentity field indicates UE identity to facilitate UE context retrieval at BS. The shortResumeMAC-I field indicates authentication token to facilitate UE authentication at BS. Hereinafter, transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Figure 8:
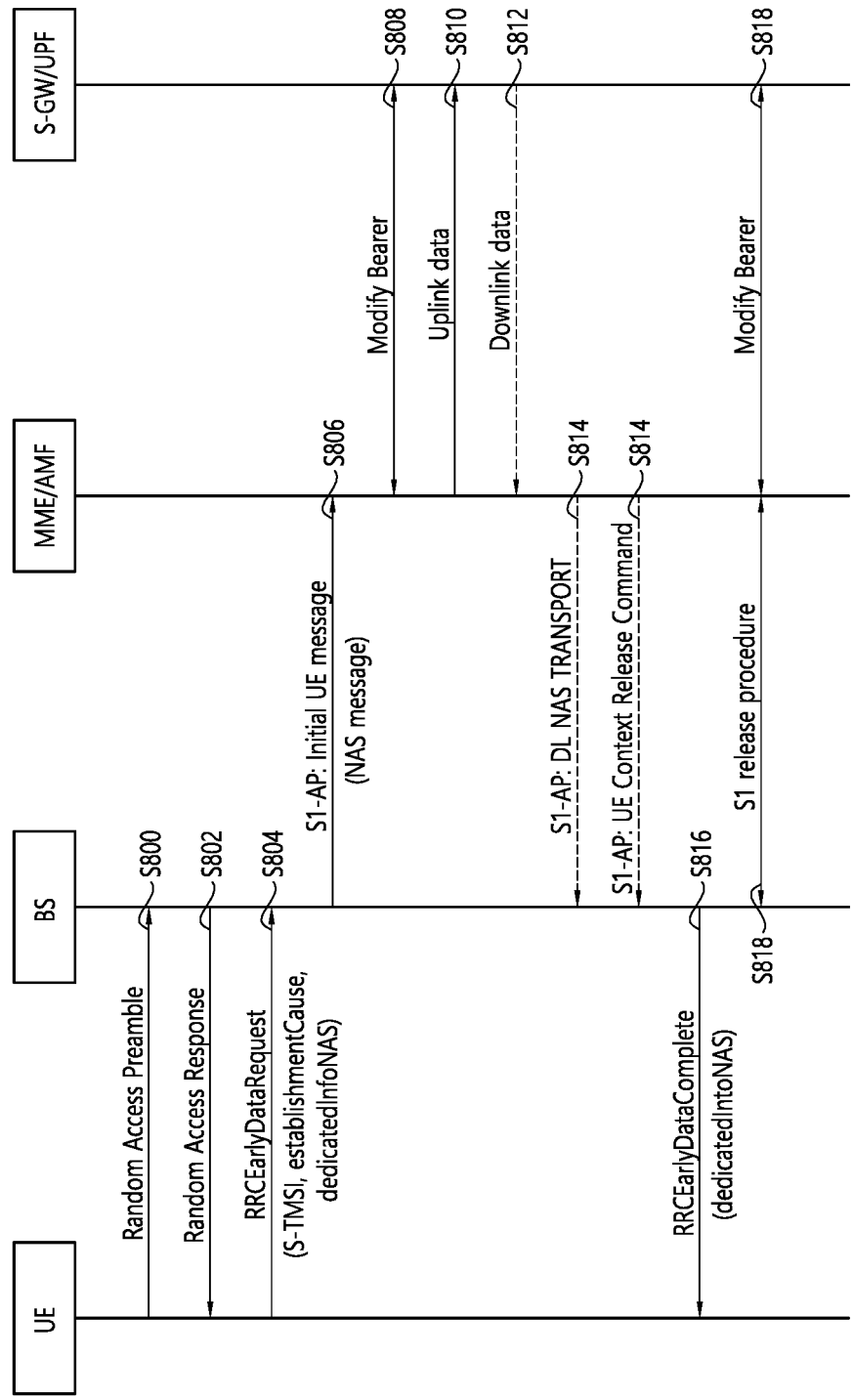
FIG. 8 shows an example of EDT for control plane CIoT EPS optimizations to which the technical features of the present disclosure can be applied.

FIG. 8 shows an example of EDT for control plane CIoT EPS optimizations to which the technical features of the present disclosure can be applied. EDT for control plane (CP) CIoT EPS optimizations (simply as CP solution) is characterized as below.

UL user data are transmitted in a NAS message concatenated in UL RRCEarlyDataRequest message on CCCH.

DL user data are optionally transmitted in a NAS message embedded in DL RRCEarlyDataComplete message on CCCH.

There is no transition to RRC_CONNECTED.

Referring to FIG. 8, upon connection establishment request for MO data from the upper layers, the UE initiates the EDT procedure and selects a random access preamble configured for EDT. In step S800, the UE transmits the random access preamble to the BS, and in step S802, the BS transmits a random access response to the UE as a response to the random access preamble.

In step S804, the UE sends RRCEarlyDataRequest message concatenating the user data on CCCH. The RRCEarlyDataRequest message may further include SAE temporary mobile subscriber identity (S-TMSI) and/or establishment cause.

In step S806, the BS initiates the S1-AP initial UE message procedure to forward the NAS message and establish the S1 connection.

In step S808, the MME requests the S-GW to re-activate the EPS bearers for the UE.

In step S810, the MME sends the UL data to the S-GW.

In step S812, if DL data are available, the S-GW sends the DL data to the MME.

In step S814, if DL data are received from the S-GW, the MME forwards the DL data to the BS. If no further data are expected, the MME can release the connection immediately.

In step S816, if no further data are expected, the BS can send the RRCEarlyDataComplete message on CCCH to keep the UE in RRC_IDLE. If the DL data were received in step S814, they are concatenated in RRCEarlyDataComplete message.

In step S818, the S1 connection is released and the EPS bearers are deactivated.

If the MME or the BS decides to move the UE in RRC_CONNECTED, RRCConnectionSetup message is sent in step S816 to fall back to the legacy RRC connection establishment procedure.

Figure 9:
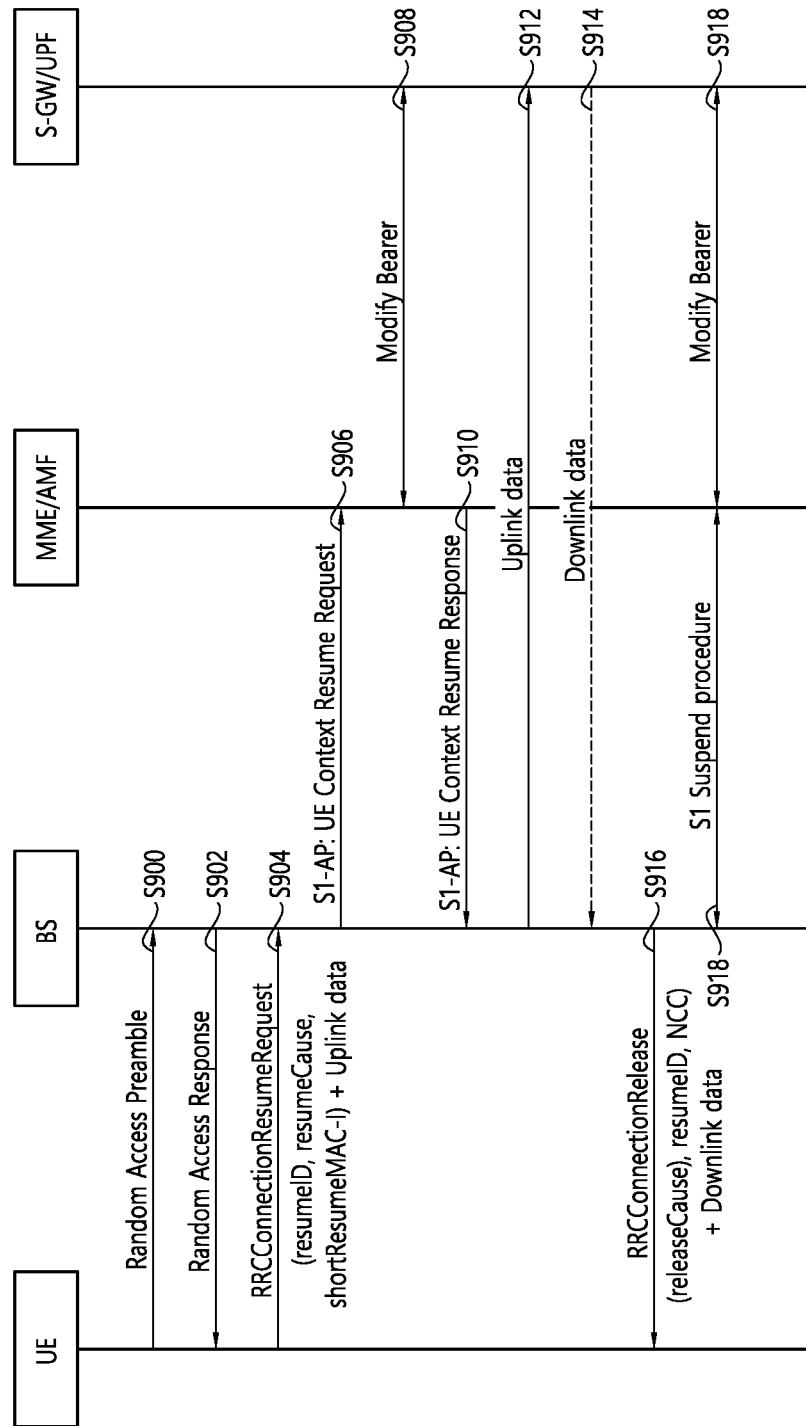
FIG. 9 shows an example of EDT for user plane CIoT EPS optimizations to which the technical features of the present disclosure can be applied.

FIG. 9 shows an example of EDT for user plane CIoT EPS optimizations to which the technical features of the present disclosure can be applied. EDT for user plane (UP) CIoT EPS optimizations (simply as UP solution) is characterized as below.

UL user data are transmitted on DTCH multiplexed with UL RRCConnectionResumeRequest message on CCCH.

DL user data are optionally transmitted on DTCH multiplexed with DL RRCConnectionRelease message on DCCH.

The user data in UL and DL are ciphered. The keys are derived using the NextHopChainingCount provided in the RRCConnectionRelease message of the previous RRC connection.

There is no transition to RRC_CONNECTED.

Referring to FIG. 9, upon connection resumption request for MO data from the upper layers, the UE initiates the EDT procedure and selects a random access preamble configured for EDT. In step S900, the UE transmits the random access preamble to the BS, and in step S902, the BS transmits a random access response to the UE as a response to the random access preamble.

In step S904, the UE sends an RRCConnectionResumeRequest to the BS, including its Resume ID, the establishment cause, and an authentication token (i.e. shortResumeMAC-I). The UE resumes all SRBs and DRBs, derives new security keys using the next hop chaining counter (NCC) provided in the RRCConnectionRelease message of the previous connection and re-establishes the AS security. The user data are ciphered and transmitted on DTCH multiplexed with the RRCConnectionResumeRequest message on CCCH.

In step S906, the BS initiates the S1-AP context resume procedure to resume the S1 connection and re-activate the S1-U bearers.

In step S908, the MME requests the S-GW to re-activate the S1-U bearers for the UE.

In step S910, the MME confirms the UE context resumption to the BS.

In step S912, the UL data are delivered to the S-GW.

In step S914, if DL data are available, the S-GW sends the DL data to the BS.

In step S916, if no further data are expected from the S-GW, the BS can send the RRCConnectionRelease message to keep the UE in RRC_IDLE. The message includes the releaseCause set to rrc-Suspend, the resumeID and the NextHopChainingCount which are stored by the UE. If DL data were received in step S914, they are sent ciphered on DTCH multiplexed with the RRCConnectionRelease message on DCCH.

In step S918, the S1 connection is suspended and the S1-U bearers are deactivated.

If the MME or BS decides the UE to move in RRC_CONNECTED, RRCConnectionResume message is sent in step S916 to fall back to the legacy RRC Connection resume procedure.

The RRC connection release is described in detail. It may be referred to as Section 5.3 of 3GPP TS 38.331 V15.3.0 (2018-09).

The purpose of the RRC connection release procedure is:
1> to release the RRC connection, which includes the release of the established radio bearers as well as all radio resources; or
1> to suspend the RRC connection, which includes the suspension of the established radio bearers.

The network initiates the RRC connection release procedure to transit a UE in RRC_CONNECTED to RRC_IDLE; or to transit a UE in RRC_CONNECTED to RRC_INACTIVE; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.

UE actions upon going to RRC_IDLE is described in detail.

UE shall:
1> reset MAC;
1> stop all timers that are running except T320 and T325;
1> discard any stored AS context, fullI-RNTI, shortI-RNTI-Value, ran-PagingCycle and ran-NotificationAreaInfo;
1> discard the AS security context including the KRRCenc key, the KRRCint, the KUPint key and the KUPenc key, if stored;
1> release all radio resources, including release of the RLC entity, the MAC configuration and the associated PDCP entity and SDAP for all established RBs;
1> indicate the release of the RRC connection to upper layers together with the release cause;
1> enter RRC_IDLE and perform procedures, except if going to RRC_IDLE was triggered by reception of the MobilityFromNRCommand message or by selecting an inter-RAT cell while T311 was running.

A wireless device may transmit data in RRC_IDLE or RRC_INACTIVE by using EDT in which UE should perform Random Access. In addition, a wireless device may transmit data with a configured grant.

If a wireless device is configured with configured grant to transmit user data in RRC_IDLE or RRC_INACTIVE and is the wireless device is also capable of Early Data Transmission (EDT), the wireless device cannot decide whether to perform data transmission with configured grant or EDT while in RRC_IDLE or RRC_INACTIVE. Therefore, a method and an apparatus for determining whether to perform transmission on a random access (RA) or a configured grant is required.

Hereinafter, a method and apparatus for determining whether to perform transmission on a random access (RA) or a configured grant in wireless communication system, according to some embodiments of the present disclosure, will be described with reference to following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
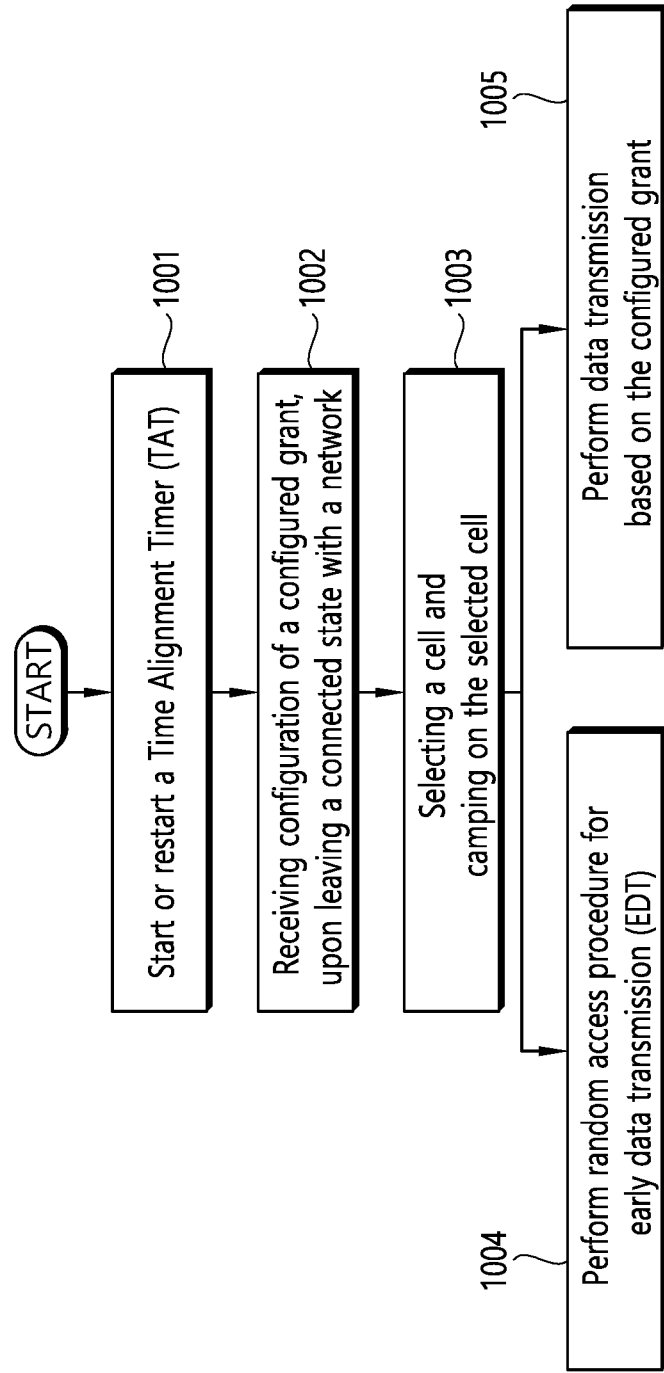
FIG. 10 shows an example of a method for determining whether to perform transmission on a random access (RA) or a configured grant, according to some embodiments of the present disclosure.

FIG. 10 shows an example of a method for determining whether to perform transmission on a random access (RA) or a configured grant, according to some embodiments of the present disclosure. More specifically, FIG. 10 shows an example of an embodiment of the present disclosure on perspective of a wireless device.

In step 1001, a wireless device may start or restart a Time Alignment Timer (TAT). A wireless device may have a configurable time alignment timer (TAT) per timing advance group (TAG), wherein a TAG may include one or more serving cells with the same uplink timing advancing (TA) and downlink timing reference cell.

For example, a wireless device may start or restart a TAT when a Timing Advance Command (TAC) MAC control element (CE) is received. When a TAC indicates a specific TAG, a wireless device may start or restart a TAT associated with the specific TAG. For other example, a wireless device may start or restart a TAT when a TAC is received in a Random Access Response message for a serving cell belonging to a TAG. For another example, when a MAC entity of a wireless device is configured with rach-skip or rach-skipSCG for primary timing advance group (pTAG), such as PCell, the wireless device may start a TAT associated with the TAG.

According to some embodiments of the present disclosure, a wireless device may start or restart a TAT while in RRC_CONNECTED. The wireless device may continue running TAT after leaving RRC_CONNECTED.

In step 1002, a wireless device may receive configuration of a configured grant upon leaving a connected state with a network (for example, a RRC_CONNECTED state). A wireless device may receive configuration upon entering RRC_INACTIVE state or RRC_IDLE state.

According to some embodiments of the present disclosure, a configured grant may be a resource of a Semi-Persistent Scheduling (SPS) configuration. The validity area may consist of one or more cells.

According to some embodiments of the present disclosure, a configured grant may be valid only for a logical channel.

According to some embodiments of the present disclosure, a configured grant may be applicable to a validity area with a validity timer. The validity area consists of one or more cells.

According to some embodiments of the present disclosure, the configuration of the configured grant may include a maximum amount of data (or maximum data rate) supported by the configured grant. A configuration of the configured grant may include a wireless device Identity (for example, a UE Identity), such as a SPS-I-RNTI, which is used by the wireless device when the wireless device performs uplink transmission with the configured grant or downlink reception while in RRC_IDLE or RRC_INACTIVE.

In step 1003, a wireless device may select a cell and camp on the selected cell. A wireless device may select a cell belonging to a validity area included in a configuration of the configured grant. A wireless device may select a cell and camp on the selected cell, while in leaving a connected state. A wireless device may select a cell and camp on the selected cell being in RRC_IDLE or RRC_INACTIVE.

In step 1004, a wireless device may perform Random Access procedure for Early Data Transmission (EDT). For example, a wireless device may perform Random Access procedure for Early Data Transmission (EDT), when data becomes available for transmission from a logical channel or a configured grant.

According to some embodiments of the present disclosure, a wireless device may perform random access procedure for EDT, when the wireless device receives system information or dedicated message indicating Early Data Transmission for the logical channel or the configured grant from the network;

According to some embodiments of the present disclosure, a wireless device may perform random access procedure for EDT, when a Timer Alignment Timer (TAT) of the wireless device is expired. A wireless device may perform random access procedure for EDT, when a Timer Alignment Timer (TAT) of the wireless device is expired and data becomes available.

According to some embodiments of the present disclosure, a wireless device may perform random access procedure for EDT, when a validity timer associated with the configured grant of the wireless device is expired. A wireless device may perform random access procedure for EDT, when a validity timer associated with a configured grant of the wireless device is expired and data becomes available.

According to some embodiments of the present disclosure, a wireless device may perform random access procedure for EDT, when the wireless device leaves a validity area associated with a configured grant. A wireless device may perform random access procedure for EDT, when the wireless device leaves a validity area associated with a configured grant and data becomes available.

According to some embodiments of the present disclosure, a wireless device may perform random access procedure for EDT, when data becomes available for a logical channel not mapped to SPS configuration.

According to some embodiments of the present disclosure, a wireless device may perform random access procedure for EDT, when data becomes available and the amount of data available for transmission is beyond the maximum amount of data (or the maximum data rate).

According to some embodiments of the present disclosure, a wireless device may perform random access procedure to send the EarlyDataRequest message or the RRCResumeRequest for Early Data Transmission without state transition to RRC_CONNECTED.

In step 1005, a wireless device may perform data transmission via a configured grant. For example, a wireless device may perform data transmission via a configured grant, when data becomes available for transmission from a logical channel or a configured grant.

According to some embodiments of the present disclosure, a wireless device may perform data transmission via a configured grant, when the wireless device receives system information or dedicated message indicating data transmission in RRC_IDLE (or RRC_INACTIVE) for the logical channel or the configured grant from the network.

According to some embodiments of the present disclosure, a wireless device may perform data transmission via a configured grant, when a Time Alignment Timer of the wireless device is running.

According to some embodiments of the present disclosure, a wireless device may perform data transmission via a configured grant, when a validity timer associated with the configured grant is running.

According to some embodiments of the present disclosure, a wireless device may perform data transmission via a configured grant, when the wireless device is located in a validity area associated with the configured grant.

According to some embodiments of the present disclosure, a wireless device may perform data transmission via a configured grant, when data becomes available for a logical channel mapped to SPS configuration.

According to some embodiments of the present disclosure, a wireless device may perform data transmission via a configured grant, when data becomes available and the amount of data available for transmission is equal to or below a maximum amount of data (or a maximum data rate). The maximum amount of data (or a maximum data rate) may be included in a configuration of the configured grant.

Figure 11:
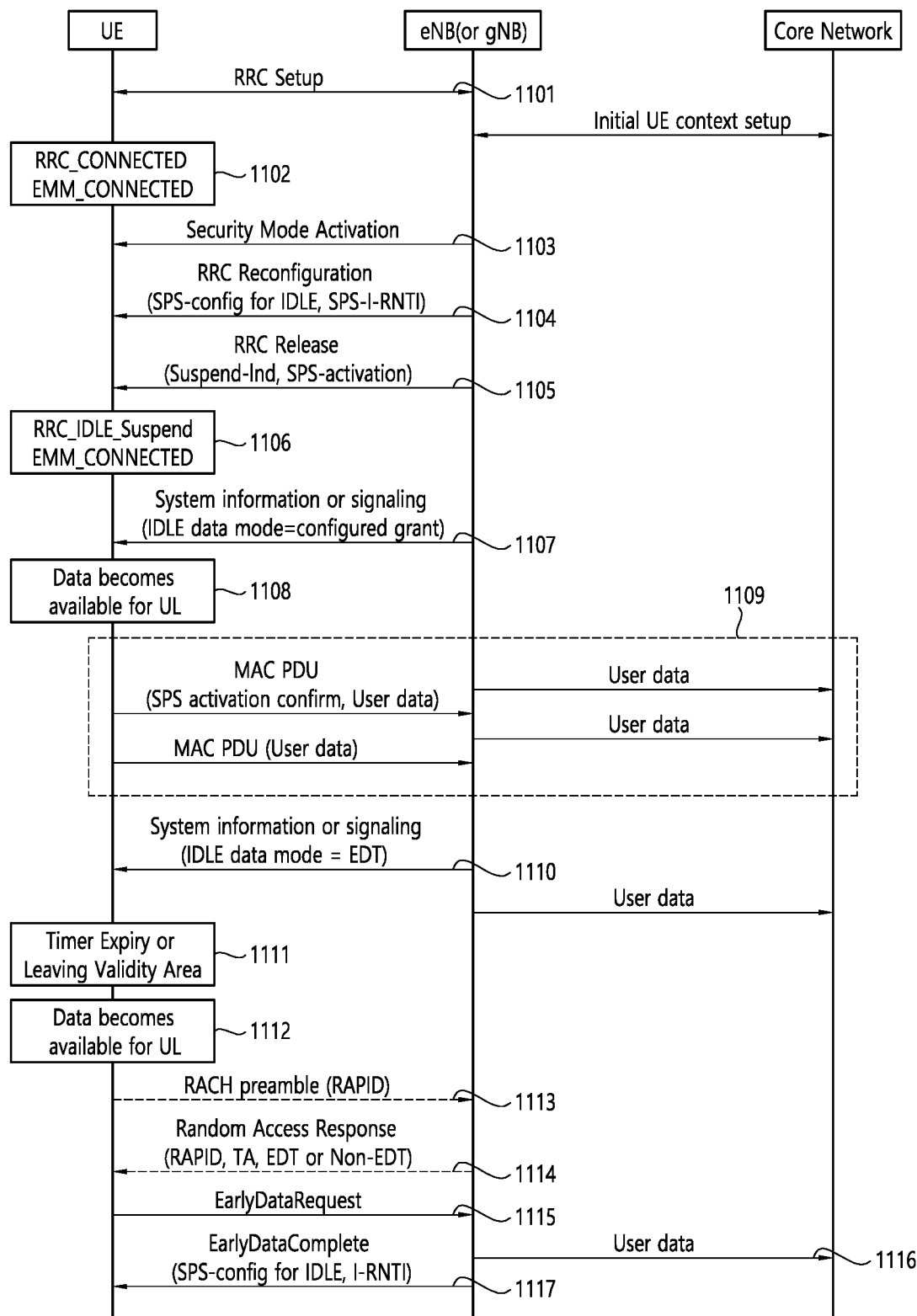
FIG. 11 shows a flow chart of a method for determining whether to perform transmission on a random access (RA) or a configured grant, according to some embodiments of the present disclosure.

FIG. 11 shows a flow chart of a method for determining whether to perform transmission on a random access (RA) or a configured grant, according to some embodiments of the present disclosure. More specifically, FIG. 11 shows an example of an embodiment of the present disclosure on perspective of a network system. The description of the same or similar features described above could be omitted or simplified, for convenience of explanation.

In step 1101, a wireless device may receive configuration for RRC setup from a network (for example, from an eNB or a gNB).

In step 1102, a wireless device may enter RRC_CONNECTED and EMM_CONNECTED at a serving cell.

In step 1103, a wireless device may receive configuration for Security Mode Activation from a network. The wireless device may perform Security Mode Activation to activate AS security.

In step 1104, a wireless device may receive RRC Connection Reconfiguration from the network to configure SPS configuration with I-RNTI. The I-RNTI may be used for data transmission in RRC_INAVTVE or RRC_IDLE. The wireless device may receive SPS configuration via system information regardless of RRC state.

According to some embodiments of the present disclosure, a wireless device may start or restart TAT while in RRC_CONNECTED. A wireless device may continue running TAT after leaving RRC_CONNECTED.

According to some embodiments of the present disclosure, a SPS configuration may include uplink and/or downlink SPS resources as uplink and/or downlink configured grants, physical resource block (PRB) or narrowband index. A SPS configuration may include a validity area, a validity timer, valid logical channels, maximum amount of data, or maximum data rate supported by the configured grant. A SPS configuration may include a wireless device Identity (for example, a UE Identity) such as a SPS-I-RNTI, which is used by the wireless device when the wireless device performs uplink transmission with the configured grant. The SPS configured grant may be valid in the validity area consisting of one or more cells including the serving cell.

The SPS configuration or the SPS configured grant may be valid in the configured PRB or narrowband while a wireless device is in RRC_IDLE or RRC_INACTEVE. RRC Release, Paging, MAC Control Element or PDCCH received in RRC_IDLE or RRC_INACTIVE could indicate SPS activation with a PRB index or a narrowband index for a particular SPS configured grant. Upon receiving such SPS activation with a PRB index or a narrowband index, a wireless device in RRC_IDLE or RRC_INACTIVE may consider the SPS configured grant or the SPS configuration as activated on the PRB or the narrowband indicated by the index.

The SPS configured grant may be valid while a validity timer is running. The validity timer could be a time Alignment Timer (TAT) or another timer. The validity timer may be configured for each configured grant. A wireless device may start or restart the validity timer (e.g. TAT) when the SPS configured grant is received. A wireless device may start or restart the validity timer when a wireless device leaves RRC_CONNECTED. A wireless device may start or restart the validity timer when Timing Advance Command is received, e.g. via MAC Control Element, Random Access Response, RRC Release message, or Paging message in RRC_IDLE or RRC_INACTIVE after leaving RRC_CONNECTED. The network may periodically send Timing Advance Command to the wireless device in RRC_IDLE or RRC_INACTIVE, e.g. by paging message in Paging Occasion of the wireless device or MAC Control Element via DL SPS configured grant.

According to some embodiments of the present disclosure, the SPS configured grant may be valid only for configured valid logical channels. When a wireless device transmits data from the valid logical channel, the wireless device could use the SPS configured grant to transmit data.

In step 1105, a wireless device may receive a RRC Release from a network. The RRC Release message may include Suspend indication. The RRC Release message may include command to pre-allocated resource, such as configured grant or SPS.

In step 1106, a wireless device may leave RRC_CONNECTED state. When a wireless device receives RRC Release message or RRC Release Indication (e.g. via PDCCH or MAC Control Element), the wireless device may leave RRC_CONNETED. The wireless device may enter to RRC_IDLE. When a wireless device receives a RRC Release message with a suspend indication, the wireless device may leave RRC_CONNETED. The wireless device may enter to RRC_INACTIVE. In RRC_IDLE or RRC_INACTIVE, a wireless device may transmit user data via the configured grant.

In step 1107, a wireless device may receive a system information or signaling which includes IDLE data mode (or INACTIVE data mode). The IDLE data mode (or the INACTIVE DATA mode) may indicate the wireless device to perform transmission on a configured grant.

According to some embodiments of the present disclosure, system information or other L1/L2/L3 message (such as Downlink Control Information in PDCCH addressed to SPS-I-RNTI, MAC Control Element, Paging message or RRC Release message) can indicate to a wireless device(s) in RRC_IDLE or RRC_INACTIVE whether the wireless device(s) should perform data transmission in RRC_IDLE or RRC_INACTIVE with EDT or the SPS Configured Grant for a logical channel or a configured grant. For example, if EDT is indicated for a logical channel or a configured grant and if data becomes available for uplink transmission for the logical channel or the configured grant, a wireless device in RRC_IDLE or RRC_INACTIVE may perform RACH procedure for EDT. For other example, if EDT is not indicated or a SPS is indicated for a logical channel or a configured grant and if data becomes available for uplink transmission for the logical channel or the configured grant, a wireless device may perform data transmission via the SPS configured grant while in RRC_IDLE or RRC_INACTIVE.

In step 1108, a wireless device may have data which becomes available for transmitting to a network. A data may become available for uplink transmission while in leaving the connected state. The data may become available in RRC_INACTIVE state or RRC_IDLE state.

In step 1109, a wireless device may transmit a MAC PDU to a network. The wireless device may transmit a MAC PDU to a Core Network through an eNB or a gNB.

If RRC Release message (or a RRC Release message with a suspend indication) indicates uplink SPS activation for a particular SPS configured grant and if data becomes available for uplink transmission in RRC_IDLE or RRC ACTIVE, a wireless device may construct a MAC PDU including SPS Confirmation MAC Control Element with user data. The SPS Confirmation MAC CE may indicate that which SPS configured grant(s) is activated or deactivated.

According to some embodiments of the present disclosure, a wireless device may periodically transmit SPS Confirmation MAC CE to inform the network that which SPS configured grant(s) is currently activated or deactivated.

According to some embodiments of the present disclosure, In RRC_IDLE state or RRC_INACTIVE state, a wireless device may perform cell reselection. If a wireless device performs cell reselection and camps on the selected cell belonging to the validity area, a wireless device may send SPS confirmation to a network to inform the network that which SPS configured grant(s) is currently activated or deactivated.

A wireless device in in RRC_IDLE or RRC_INACTIVE may perform uplink transmissions by using the pre-allocated resource, such as a SPS configured grant. SPS configured grant could be either contention based or contention free.

A wireless device in RRC_IDLE or RRC_INACTIVE should transmit data with an ID of the wireless device, such as SPS-I-RNTI, I-RNTI, or S-TMSI, in contention based SPS configured grant. A wireless device in RRC_IDLE or RRC_INACITVE may include an ID of the wireless device in a RRC message or a MAC CE to be transmitted from uplink.

According to some embodiments of the present disclosure, before transmitting a MAC PDU by using contention based configured grant, a wireless device in RRC_IDLE or RRC_INACTIVE may perform Access Barring Check to determine whether or not to perform transmission of the MAC PDU via the SPS configured grant based on barring information received from system information. If access attempt is allowed as the result of Access Barring Check, the wireless device may perform transmission of the MAC PDU.

The network may indicate to a wireless device whether the SPS configured grant or the SPS configuration requires Access Barring Check. Thus, if indicated, MAC of the wireless device may request RRC of the wireless device to perform Access Barring Check before transmission of the MAC PDU via the SPS configured grant. Then, RRC of the wireless device may inform MAC of the wireless device about the result of the Access Barring Check. If access attempt is allowed as the result of Access Barring Check, MAC of the wireless device may perform transmission of the MAC PDU.

According to some embodiments of the present disclosure, a wireless device in RRC_IDLE or RRC_INACTIVE may transmit a MAC PDU with ID of the wireless device, such as SPS-I-RNTI or S-TMSI, in contention based SPS configured grant. MAC entity of the wireless device may consider transmission of the MAC PDU as successful after contention resolution message as well as positive HARQ feedback is received in downlink.

According to some embodiments of the present disclosure, a wireless device in RRC_IDLE or RRC_INACTIVE could transmit data without ID of the wireless device (for example, an UE ID) in contention free SPS configured grant. A wireless device may not need to perform Access Barring Check before transmitting MAC PDU by using contention free SPS configured grant. In this case, MAC entity of the wireless device may consider transmission of the MAC PDU as successful after positive HARQ feedback is received in downlink without contention resolution message.

According to some embodiment of the present disclosure, when a wireless device enters RRC_IDLE (or RRC_INACTIVE) by receiving a RRC Release message (or a RRC Release message with a suspend indication), the RRC Release message (or the RRC Release message with a suspend indication) may indicate downlink SPS activation for a particular SPS configured grant. A wireless device may activate the downlink SPS configured grant. When data becomes available for downlink transmission in RRC_IDLE (or RRC_INACTIVE), the network may send user data by using the DL SPS configured grant. The network may indicates to the wireless device that the DL SPS is deactivated by sending Paging, MAC Control Element or PDCCH to the wireless device in RRC_IDLE (or RRC_INACTIVE). Then, the wireless device may transmit DL data via the SPS configured grant.

According to some embodiment of the present disclosure, when a wireless device enters RRC_IDLE (or RRC_INACTIVE) by receiving a RRC Release message (or a RRC Release message with a suspend indication), the RRC Release message (or the RRC Release message with a suspend indication) may indicate downlink SPS deactivation for a particular SPS configured grant. Otherwise, the network may indicate to the wireless device that the DL SPS is deactivated by sending Paging, MAC Control Element or PDCCH to the wireless device in RRC_IDLE (or RRC_INACTIVE). In this case, the network may indicate to the wireless device that the DL SPS is activated by sending Paging, MAC Control Element or PDCCH to the wireless device in RRC_IDLE (or RRC_INACTIVE). Then, the wireless device may transmit DL data via the SPS configured grant.

In step 1110, a wireless device may receive a system information or signaling which includes IDLE data mode (or INACTIVE data mode). The IDLE data mode (or the INACTIVE DATA mode) may indicate the wireless device to perform transmission on a random access.

In step 1111, a validity timer (for example, a TAT) may be expired or a wireless device may leave a validity area. In step 1112, a data may become available for transmission.

According to some embodiments of the present disclosure, (if EDT is indicated by system information and data becomes available for transmission) when the TAT is expired, or when the validity timer is expired, and if conditions for Early Data Transmission (EDT) are met, a wireless device may initiate Random Access procedure to perform EDT procedure. But, if conditions for EDT are not met, the wireless device may perform RRC Connection Establishment or RRC Resume procedure.

According to some embodiments of the present disclosure, (if EDT is indicated by system information and data becomes available for transmission) when a wireless device leaves the validity area, and if conditions for Early Data Transmission (EDT) are met, the wireless device may initiate Random Access procedure to perform EDT procedure. But, if conditions for EDT are not met, the wireless device may perform RRC Connection Establishment or RRC Resume procedure.

According to some embodiments of the present disclosure, (if EDT is indicated by system information and data becomes available for transmission) when data becomes available for a logical channel not mapped to the SPS configuration or the SPS configured grant, and if conditions for Early Data Transmission (EDT) are met, a wireless device may initiate Random Access procedure to perform EDT procedure. But, if conditions for EDT are not met, the wireless device may perform RRC Connection Establishment or RRC Resume procedure.

According to some embodiments of the present disclosure, (if EDT is indicated by system information and data becomes available for transmission) when data becomes available and the amount of data available for transmission is beyond the maximum amount of data (or the maximum data rate), and if conditions for Early Data Transmission (EDT) are met, a wireless device may initiate Random Access procedure to perform EDT procedure. But, if conditions for EDT are not met, the wireless device may perform RRC Connection Establishment or RRC Resume procedure.

In step 1113, a wireless device may transmit RACH preamble with a RAPID.

In step 1114, a wireless device may receive a Random Access Response (RAR) from a network. The network sends Random Access Response (RAR) message, in response to the RACH preamble, to the wireless device. The RAR message may include RACH preamble index (RAPID), Time Advance command (TAC), and SPS-I-RNTI. In addition, the RAR message (or system information) may indicate which type of message 3 the wireless device should send (for example, EarlyDataRequest, RRCConnectionRequest or RRCResumeRequest) or which procedure the wireless device should trigger for message 3 (for example, EDT for Control Plane (CP) CIoT Optimization, EDT for User Plane (UP) CIoT Optimization, RRC Connection Establishment or RRC Resume procedure).

In step 1115, a wireless device may transmit a message 3, such as Early Data Request. According to some embodiments of the present disclosure, based on the RAR message, a wireless device may transmit a message 3, for example, one of EarlyDataRequest, RRCConnectionRequest or RRCResumeRequest, possibly with user data.

In step 1116, an eNB or gNB may transmit user data received from the wireless device to a Core Network.

In step 1117, a wireless device may receive message 4, such as Early Data Complete. The message 4 may include SPS reconfiguration and new SPS-I-RNTI. If a wireless device enters RRC_CONNECTED after receiving message 4, the wireless device may transmit user data in RRC_CONNECTED.

When a wireless device receives message 4 for EDT CP or UP, the wireless device may not enter RRC_CONNECTED. As a result, the wireless device may keep staying in RRC_IDLE. For example, the message 4 may include SPS configuration so that the wireless device reconfigures SPS accordingly for data transmission in RRC_IDLE.

According to some embodiments of the present disclosure, when a wireless device is configured with both a configured grant and Early Data Transmission to transmit user data in RRC_IDLE and/or RRC_INACTIVE, the wireless device can decide whether to perform data transmission with configured grant or with Early Data Transmission while in RRC_IDLE and/or RRC_INACTIVE.

According to some embodiments of the present disclosure, a wireless device can perform data transmission based on either one of configured grant or Early Data transmission by network control and/or specific conditions.

According to some embodiments of the present disclosure, when the configured grant can be used, the wireless device can perform data transmission with configured grant. When the configured grant cannot be used, the wireless device can perform data transmission with Early Data Transmission.

Figure 12:
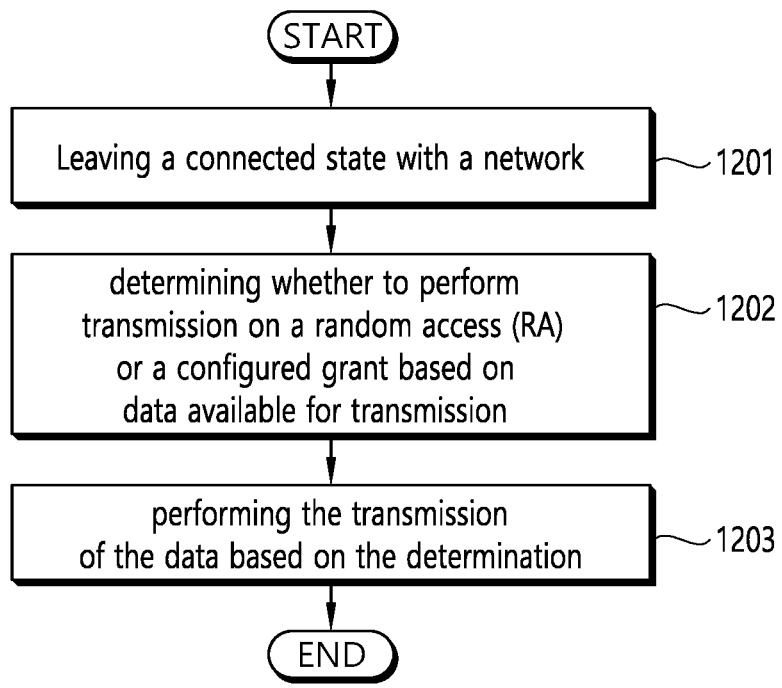
FIG. 12 shows a method for determining whether to perform transmission on a random access (RA) or a configured grant, according to some embodiments of the present disclosure.

FIG. 12 shows a method for determining whether to perform transmission on a random access (RA) or a configured grant, according to some embodiments of the present disclosure. The description of the same or similar features described above could be omitted or simplified, for convenience of explanation.

In step 1201, a wireless device may leave a connected state with a network. A wireless device may leave a RRC_CONNECTED state with a network. A wireless device may release RRC_CONNECTED state and enter RRC_IDLE state. A wireless device may suspend (or release with suspend) RRC_CONNECTED state and enter RRC_INACTIVE state.

In step 1202, a wireless device may determine whether to perform transmission on a random access (RA) or a configured grant. A wireless device may determine whether to perform transmission on a random access (RA) or a configured grant based on data available for transmission. For example, a wireless device may determine whether to perform transmission on a random access (RA) or a configured grant when data becomes available.

The configured grant may be received from the network. According to some embodiments of the present disclosure, a configuration of a configured grant may include an information of a logical channel for the configured grant. The configured grant is valid only for a logical channel.

According to some embodiments of the present disclosure, a wireless device may receive configuration of the configured grant before leaving the connected state. A wireless device may receive configuration of the configured grant upon leaving the connected state. A wireless device may receive configuration of the configured grant from a network in a connected state with the network. For example, a wireless device may receive configuration of the configured grant in RRC_CONNECTED state.

According to some embodiments of the present disclosure, a wireless device may receive configuration of the configured grant while in leaving a connected state with a network. For example, a wireless device may receive a configured grant (or a SPS configuration) in RRC_IDLE state or RRC_INACTIVE state. For other example, a wireless device may receive SPS configuration via system information regardless of RRC state.

According to some embodiments of the present disclosure, a configuration of a configured grant may include a maximum amount of data supported by the configured grant. A configuration of a configured grant may include an identity of the wireless device which is used by the wireless device when the wireless device performs uplink transmission with the configured grant or downlink reception, while in leaving the connected state.

According to some embodiments of the present disclosure, a wireless device may determine whether to perform transmission on a random access (RA) or a configured grant based on a type of the data available for transmission.

According to some embodiments of the present disclosure, a wireless device may determine whether to perform transmission on a random access (RA) or a configured grant based on amount of the data available for transmission.

For example, when the amount of data available for transmission is beyond the maximum amount of data (or the maximum data rate) supported by the configured grant, the wireless device may determine to perform transmission on a random access (RA) for an Early Data Transmission (EDT).

For example, when the amount of data available for transmission is equal to or below than a maximum amount of data (or the maximum data rate) supported by an EDT on the RA, the wireless device may determine to perform transmission on a configured grant.

For example, the wireless device may determine to perform transmission on a RA using an EDT, when the amount of data available for transmission is smaller than a predetermined threshold.

For example, the wireless device may determine to perform transmission on a RA using an EDT, when the amount of data available for transmission is bigger than a predetermined threshold.

For example, when the amount of data available for transmission is equal to or below than a maximum amount of data (or the maximum data rate) supported by the configured grant, the wireless device may determine to perform transmission on a configured grant.

For example, when the amount of data available for transmission is beyond a maximum amount of data (or the maximum data rate) supported by an EDT on the RA, the wireless device may determine to perform transmission on a configured grant.

For example, the wireless device may determine to perform transmission on a configured grant, when the amount of data available for transmission is smaller than a predetermined threshold.

For example, the wireless device may determine to perform transmission on a configured grant, when the amount of data available for transmission is bigger than a predetermined threshold.

For example, the wireless device may determine perform a RA procedure to enter RRC_CONNECTED state, when the amount of the data available is bigger than the maximum amount of data supported by either the configured grant or the EDT on the RA. However, the present disclosure is not limited thereto.

According to some embodiments of the present disclosure, a wireless device may determine whether to perform transmission on a random access (RA) or a configured grant based on a logical channel of the data available for transmission.

According to some embodiments of the present disclosure, a wireless device may determine whether to perform transmission on a random access (RA) or a configured grant based on mapping between the configured grant and a logical channel of the data available for transmission.

For example, the wireless device may determine to perform transmission on a RA using an EDT, when a logical channel is not mapped to the configured grant. The wireless device may determine to perform transmission on a RA using an EDT, when a logical channel of the data available is not mapped to the configured grant.

For example, the wireless device may determine to perform transmission on a configured grant, when a logical channel is mapped to the configured grant. The wireless device may determine to perform transmission on a configured grant, when a logical channel of the data available is mapped to the configured grant.

According to some embodiments of the present disclosure, a wireless device may receive a system information and/or a message, from the network. A wireless device may receive a system information and/or a message, from the network, regardless of the connected state. Since a wireless device may receive a system information in RRC_IDLE or RRC_INACTIVE. The system information and/or a message may include an information for the logical channel or the configured grant.

For example, the message is L1, L2, and/or L3 message, such as Downlink Control Information in PDCCH addressed to SPS-I-RNTI, MAC Control Element, Paging message or RRC Release message.

A wireless device may determine whether to perform transmission on a random access (RA) or a configured grant based the received system information or the received message. For example, the system information or the message may indicate to the wireless device in RRC_IDLE or RRC_INACTIVE, whether the wireless device should perform data transmission with EDT or the configured grant.

For example, if EDT is indicated for data available, a wireless device in RRC_IDLE or RRC_INACTIVE may perform RACH procedure for EDT.

For other example, if EDT is not indicated for the data available, the wireless device may perform data transmission via the configured grant, while in RRC_IDLE or RRC_INACTIVE.

According to some embodiments of the present disclosure, a wireless device may deactivate a configured grant. A wireless device may deactivate a configured grant based on that it is determined to perform the transmission on the RA.

In step 1203, a wireless device may perform a transmission of a data based on the determination in the step 1202. For example, a wireless device may perform a transmission on a RA using an EDT based on the determination. For other example, a wireless device may perform a transmission on a configured grant based on the determination.

According to some embodiments of the present disclosure, a wireless device may perform a transmission of data available using an Early Data transmission (EDT) on the RA, based on that it is determined to perform the transmission on the RA.

According to some embodiments of the present disclosure, a wireless device may deactivate a configured grant. For example, a wireless device may deactivate a configured grant based on that it is determined to perform the transmission on the RA. For example, a wireless device may deactivate a configured grant when the wireless device performs the transmission of the data on the RA.

According to some embodiments of the present disclosure, the wireless device could decide whether to perform data transmission with configured grant or with Early Data Transmission while in RRC_IDLE and/or RRC_INACTIVE, when the wireless device is configured with both of a configured grant and Early Data Transmission for transmitting user data in RRC_IDLE and/or RRC_INACTIVE.

According to some embodiments of the present disclosure, the wireless device could decide whether to perform data transmission on RA or a configured grant, by considering the data available for transmission (for example, amount of the data available), while in leaving a connected state with a network.

According to some embodiments of the present disclosure, a wireless device could transmit the data available efficiently, since the wireless device may perform data transmission based on either of configured grant or Early Data transmission.

According to some embodiments of the present disclosure, the wireless device could perform data transmission with configured grant, when the configured grant can be used. The wireless device could perform data transmission with EDT, when the configured grant cannot be used.

Figure 13:
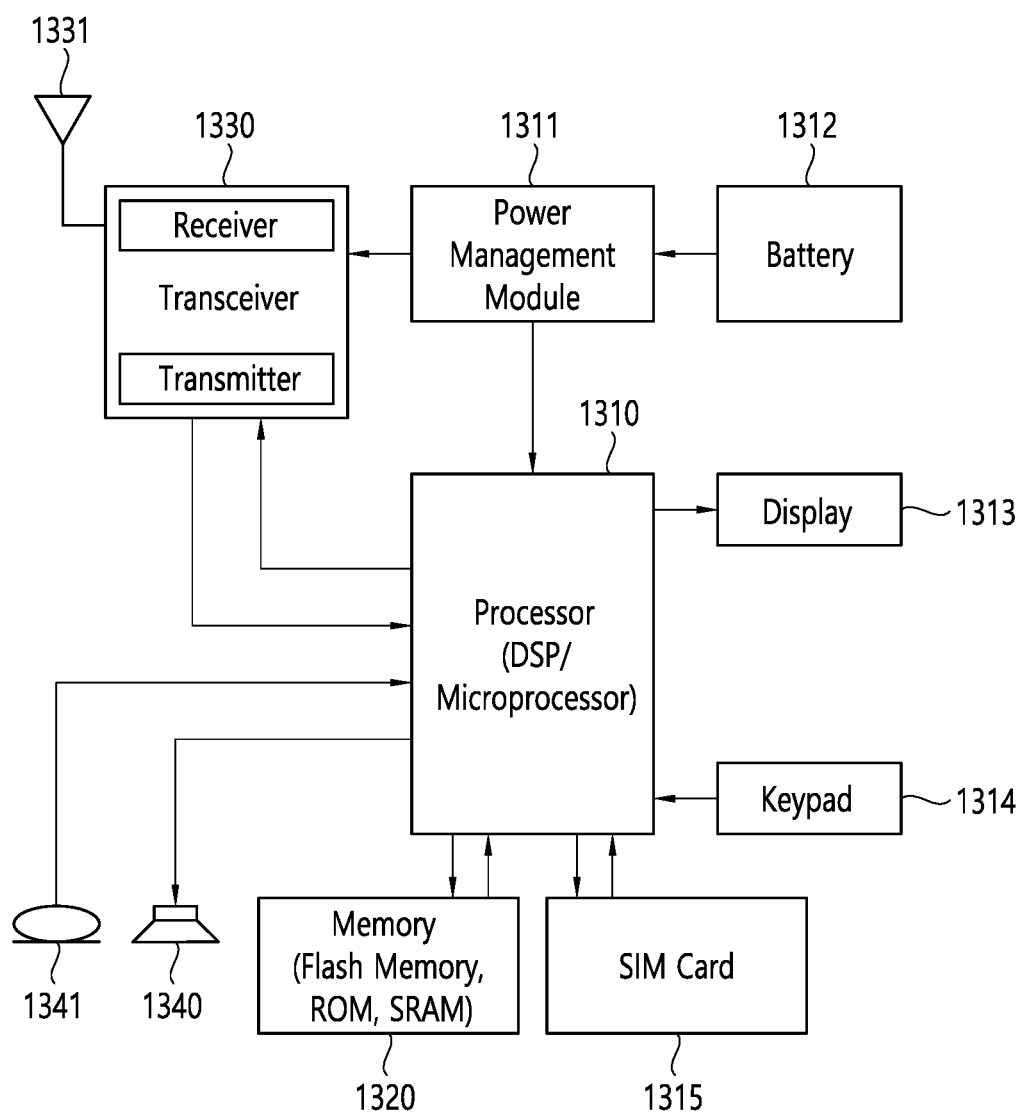
FIG. 13 shows an apparatus for determining whether to perform transmission on a random access (RA) or a configured grant, according to some embodiments of the present disclosure.

FIG. 13 shows an apparatus for determining whether to perform transmission on a random access (RA) or a configured grant, according to some embodiments of the present disclosure. The description of the same or similar features described above could be omitted or simplified, for convenience of explanation.

An apparatus may be referred as a wireless device, such as a user equipment (UE), an Integrated Access and Backhaul (IAB), or etc.

A wireless device includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to some embodiments of the present disclosure, the processor 1310 may be configured to be coupled operably with the memory 1320 and the transceiver 1330. The processor 1310 may be configured to leave a connected state with a network. The processor 1310 may be configured to determine whether to perform transmission on a random access (RA) or a configured grant based on data available for transmission. The configured grant is received from the network. The processor 1310 may be configured to perform the transmission of the data based on the determination.

According to some embodiments of the present disclosure, the processor 1310 may be configured to perform transmission with the configured grant during a validity time mapped to the configured grant. The processor 1310 may be configured to perform a random access to the network, after the validity timer is expired. The processor 1310 may be configured to deactivate the configured grant, when the validity timer is expired.

According to some embodiments of the present disclosure, a wireless device could transmit data efficiently, while in leaving a connected state with a network, since the wireless device may perform data transmission based on either of configured grant or Early Data transmission.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 14:
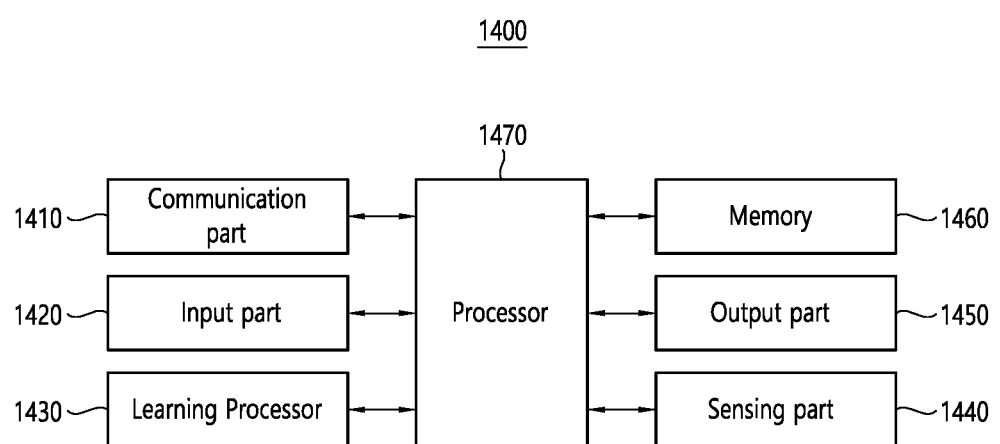
FIG. 14 shows an example of an AI device to which the technical features of the present disclosure can be applied.

FIG. 14 shows an example of an AI device to which the technical features of the present disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
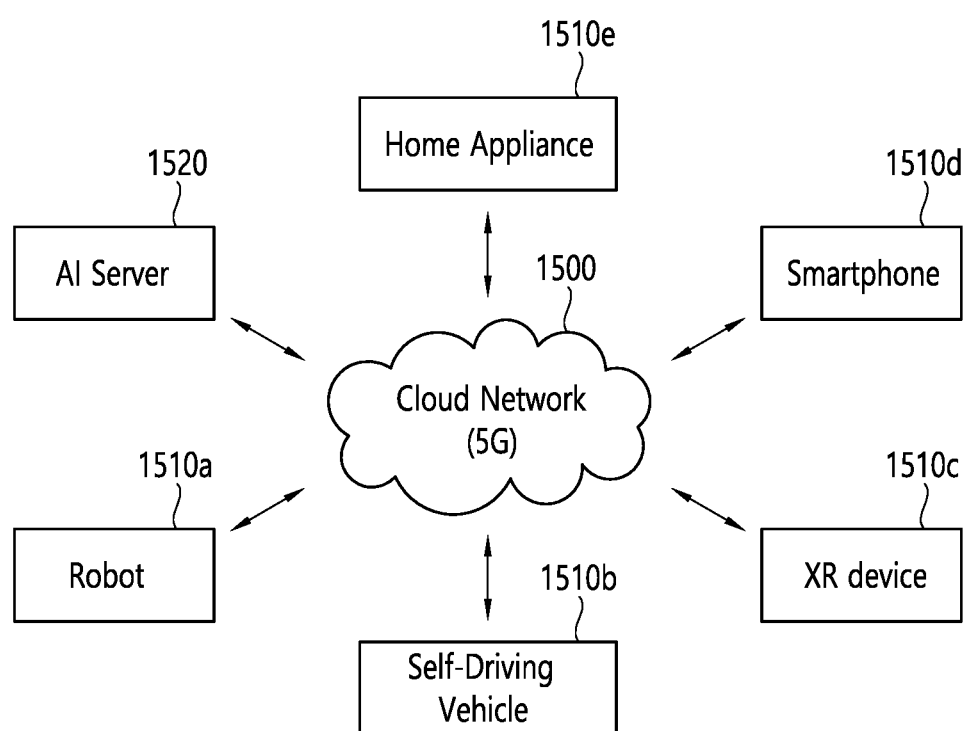
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving a radio resource control (RRC) connection release message including a configuration for a preconfigured uplink resource (PUR),
   wherein the configuration for the PUR includes information on a TimeAlignmentTimer (TAT) for the PUR;
   starting the TAT for the PUR;
   based on that a system information block (SIB) includes an indication informing whether the wireless device is allowed to initiate the EDT, initiating Early Data Transmission (EDT); and
   based on that (i) an amount of uplink data being smaller than or equal to a maximum amount of data configured for transmission using the PUR and (ii) the TAT for the PUR being running, initiating transmission using the PUR; and
   based on that both the EDT and the transmission using PUR are not initiated, transmitting an RRCConnectionRequest message.

2. The method of claim 1,
   wherein the configuration for the PUR includes an identity of the wireless device for uplink transmission or downlink reception with the PUR.

3. The method of claim 1, wherein the method further comprises,
   upon receiving the RRC release message:
   selecting a cell on the network; and
   camping on the cell.

4. The method of claim 1,
   wherein the configuration for the PUR includes information on a validity area for the PUR.

5. The method of claim 4,
   wherein information on the validity area includes one or more cells.

6. The method of claim 1,
   wherein the configuration for the PUR includes information on the maximum amount of data configured for transmission using the PUR.

7. The method of claim 1, wherein the wireless device is an autonomous driving apparatus in communication with at least one of a mobile terminal, a network, and/or autonomous vehicles other than the wireless device.

8. A wireless device in a wireless communication system, the wireless device comprising:
- at least one memory;
- at least one transceiver; and
- at least one processor, operably coupled to the at least one memory and the at least one transceiver, and adapted to:
- control the at least one transceiver to receive a radio resource control (RRC) connection release message including a configuration for a preconfigured uplink resource (PUR),
- wherein the configuration for the PUR includes information on a TimeAlignmentTimer (TAT) for the PUR;
- start the TAT for the PUR;
- based on that a system information block (SIB) includes an indication informing whether the wireless device is allowed to initiate the EDT, initiating Early Data Transmission (EDT);
- based on that (i) an amount of uplink data being smaller than or equal to a maximum amount of data configured for transmission using the PUR and (ii) the TAT for the PUR being running, initiating transmission using the PUR; and
- based on that both the EDT and the transmission using PUR are not initiated, transmitting an RRCConnectionRequest message.

9. The wireless device of claim 8,
wherein the configuration for the PUR includes an identity of the wireless device for uplink transmission or downlink reception with the PUR.

10. The wireless device of claim 8, the at least one processor is further adapted to,
upon receiving the RRC release message:
- select a cell on the network; and
- camp on the cell.

11. The wireless device of claim 8,
wherein the configuration for the PUR includes information on a validity area for the PUR.

12. The wireless device of claim 11,
wherein information on the validity area includes one or more cells.

13. The wireless device of claim 8,
wherein the configuration for the PUR includes information on the maximum amount of data configured for transmission using the PUR.

14. The wireless device of claim 8,
wherein the wireless device is an autonomous driving apparatus in communication with at least one of a mobile terminal, a network, and/or autonomous vehicles other than the wireless device.

* * * * *